US005653573A

United States Patent [19]

[11] Patent Number: 5,653,573
[45] Date of Patent: Aug. 5, 1997

Aoki et al.

[54] SHEET BUNDLE DISCHARGE-HANDLING AND GUIDED STOWING MECHANISM

[75] Inventors: Takeshi Aoki; Keiji Okumura; Masaki Deguchi, all of Osaka, Japan

[73] Assignee: Mita Industrial Co., Ltd., Osaka, Japan

[21] Appl. No.: 402,482

[22] Filed: Mar. 10, 1995

[30] Foreign Application Priority Data

| | | | |
|---|---|---|---|
| Mar. 15, 1994 | [JP] | Japan | 6-044125 |
| Mar. 15, 1994 | [JP] | Japan | 6-044126 |
| Mar. 15, 1994 | [JP] | Japan | 6-044127 |

[51] Int. Cl.[6] .................. B65G 57/03; B65H 29/02

[52] U.S. Cl. .................. 414/790.2; 414/793.4; 271/3.01; 271/287; 271/298; 399/404; 399/405

[58] Field of Search .................. 414/790.2, 793.4, 414/754, 780; 271/3.01, 3.12, 279, 287, 298, 185, 220, 293; 270/58.14, 58.15, 58.16, 58.18, 58.19; 355/321, 322, 323, 324

[56] References Cited

U.S. PATENT DOCUMENTS

| | | | |
|---|---|---|---|
| 4,376,529 | 3/1983 | George et al. | 270/58.16 |
| 4,946,152 | 8/1990 | Ishikawa et al. | 271/3.01 |
| 5,011,131 | 4/1991 | Maier et al. | 271/287 |
| 5,125,634 | 6/1992 | Lawrence | 270/58.15 |
| 5,186,445 | 2/1993 | Nakanishi et al. | 270/58.14 |
| 5,201,503 | 4/1993 | Matsui et al. | 270/58.14 |
| 5,407,186 | 4/1995 | Hayama et al. | 355/324 |

*Primary Examiner*—Karen B. Merritt
*Assistant Examiner*—Douglas Hess
*Attorney, Agent, or Firm*—Beveridge, DeGrandi, Weilacher & Young, LLP

[57] ABSTRACT

In a multi-bundle stacker having an inclined bundle-discharging mechanism for frontward discharging of copy-sheet bundles from adjacent upwardly inclined sorting trays of a sorter disposed on the side of a photocopying machine, a stowing bin is provided having a bundle-receiving platform lying at an inclination generally parallel to the inclination of the sorting trays. A bundle discharge/stowing path, that the trailing end nearest the copying machine of a sheet bundle discharged into stowage follows, is defined having a portion generally orthogonal to, and lying between, the bundle-discharging mechanism and the stowing bin. A standing wall extends partially in the discharge/stowing path upward from the stowing bin. A tilted bundle stowing guide is mounted on a triangular foot over the standing wall. A bundle turning guide assembly including a pusher mechanism intersects the bundle discharge/stowing path at an angle below the bundle stowing guide. The trailing end of a sheet bundle in stowage guided down the bundle stowing guide is turned toward horizontal as it leaves the bottom of the guide and passes along a guide plate of the bundle turning guide assembly. The pusher mechanism, cooperative with a mechanism for retracting the guide plate clear of the bundle as it leaves the bundle stowing guide, pushes the upper portion of the trailing end of the bundle down off the guide plate, and the bundle is guided to settle into a stack in the stowing bin.

27 Claims, 23 Drawing Sheets

SHEET BUNDLE DISCHARGE-HANDLING AND GUIDED STOWING MECHANISM

BACKGROUND OF THE INVENTION

1. Field of the Invention

The present invention is directed to sheet bundle stowage in an image reproduction apparatus, and more particularly, it relates to a mechanism for handling bundled stacks of copy sheets withdrawn from sorting trays of a sorting device associated with a copying machine, and for guiding the bundles into a stowing bin.

2. Description of Related Art

Photocopying machines and like image-reproducing apparatus can be provided with sheet sorters for sorting image-bearing copy sheets following the image-reproducing operation. Copy sheet-sorting devices in image-reproducing applications that moreover feature a stapler for stapling the sheets once they have been sorted into copy stacks are commercially available.

Copy sheet sorting devices for copying machines are provided with a set of sorting trays, and the number of sorting trays used in a given copying operation will correspond to the number of document copies designated by an operator. With copying machines equipped with an automatic sheet feeder capable of recirculating a stack of original document sheets over the image-scanning station, it is possible to produce a number of copies of a document stack greater than the number of trays furnished in the sorting device by passing the same copying operation through a number of cycles. This makes it necessary, however, to remove the sorted copy-sheet stacks from the trays, to allow copy sheets from the next copying cycle to be properly sorted into temporary storage in the tray set. This in turn requires that the sheet stacks be bundled (typically they are stapled), if they are to be removed by other than manual means. Thereafter, the bundled copy-sheet stacks may be discharged into a stowing bin or the like, apart from the sorting trays of the sorting device.

In one known sorting device for such an application, copy-sheet stacks are transported to a stapling section where the sheets in the stack are held momentarily, brought into register, and then the stack is stapled. The stapler in this device is located below the sorting trays, and a stowing bin is provided beneath the stapler for receiving the copy-sheet bundles.

Copy-sheet bundles thus processed by the sorting device accompanying the copying machine are left stowed to the side of the copying machine, beneath the sorting trays in a position encumbering removal. Accordingly, in a co-pending application (U.S. application Ser. No. 08/053, 952, filed Apr. 28, 1993), the present applicant has disclosed a copy-sheet bundle stowing unit on the front of a sorting device for an associated copying machine. The sheet-bundle stowing unit discharges sorted and stapled copy-sheet bundles into stowage in a forward-opening stowing bin, in front of the sorting trays beside the copying machine. The bundled copy-sheet stacks are therein easily removed from the stowing bin of the sorting device.

In the bundle stowing unit attached to the sorting device accordingly proposed by the applicant earlier, the sorting trays, lying in the direction of sheet-sorting transport as the copy sheets are discharged from the photocopying machine, are inclined upward. Stapled copy-sheet stacks are withdrawn forward from the inclined trays, transverse to the direction of copying machine sheet discharge, into a stowing path of the stowing unit. The stowing path includes a bundle-receiving surface, a bottom front portion of which is horizontal, lying in the stowing bin, while the remaining portion is inclined upward and away (i.e., toward the sorting trays). As the copy sheet bundle is stowed, the inclined bundle drops onto the bundle-receiving surface. Therein, the weight of the bundle is initially on that corner lying front and downward as it strikes the bundle-receiving surface, and the bundle corner consequently can become bent or crumpled. This can particularly be a problem in cases where the copy bundles are stacks of sheets of multiple sizes.

In the sheet-bundle stowing unit as disclosed in U.S. application Ser. No. 08/053,952, the bundles should land face-up on the inclined bundle-receiving surface, flexed slightly with the (usually) lengthwise forward portion lying lower than the lengthwise rearward portion. Accordingly, when the stowing bin is drawn open, the copy-sheet bundles are properly presented. In this configuration, however, occasionally the bundles dropping onto the receiving surface do not land correctly, sometimes bending or crumpling, or, moreover, turning upside down, for example, or being left leaning against a front wall of the stowing bin. Consequently disarranged, the stack of copy-sheet bundles is not easily removed from the stowing bin.

To address such problems in the system as above for discharging and dropping copy-sheet bundles into a stowing bin, the present applicant has further disclosed, in Japanese Patent Application Laid-Open No. 64429/1993, a sorting device having a bundle-stacking apparatus for discharging copy-sheet bundles into a bundle-stowing bin that is provided with a bundle-receiving surface lying at an incline generally corresponding to the inclination of the sorting trays. While the bundle-stacking apparatus is situated in front of the sorting device, access to the bundle-stowing bin in order to remove the finished and stowed copy-sheet bundles is lateral.

A copy-sheet bundle discharge/stowing path is defined in the bundle-stacking apparatus between the sorting trays and the stowing bin. The discharge/stowing path includes a standing guide wall lying inclined, wherein it is generally orthogonal to both the angle of incline of the sorting trays, and of the bundle-receiving surface lying parallel below. Accordingly, the standing wall serves to conduct endwise each bundle transversely discharged from a sorting tray, such that the bottom of the bundle will land at once on the bundle-receiving surface, preventing bending or crumpling damage to the bundle.

In this bundle-stacking apparatus, however, there is a tendency for discharged bundles dropping along the standing wall into stowage to flex against the standing wall under their own weight, especially if there are fewer sheets in the bundles, or if the sheets are not very stiff. This tendency of the bundles to flex leads to problems in how the bundles land on the bundle-receiving surface, such that they might nonetheless become bent or crumpled. Poorly stowed bundles, moreover, can be a nuisance to remove from the stowing bin.

SUMMARY OF THE INVENTION

It is an object of the present invention to ensure that copy-sheet bundles discharged from a sorting device, associated with an image-reproducing apparatus, into a multi-bundle stowing device are stowed into a stowing bin of the multi-bundle stowing device in a neat, correctly oriented stack presented for easy removal from the stowing bin.

The present invention according to a principal aspect provides an apparatus for discharge-handling and guided stowing of copy-sheet bundles withdrawn from inclined sorting trays of an associated copy-sheet sorting device, in installation with an image-reproducing apparatus. The sorting trays angle up and away from the image-reproducing apparatus. Copy sheets are discharged sideways from the image-reproducing apparatus, sorted into the trays of the sorting device and processed therein into bundles. The sorting trays of the laterally disposed sorting device store accordingly sorted and bundled copy-sheet stacks.

The bundle discharge/stowing apparatus comprises a bundle discharging means and a stowing bin, connected by a bundle discharge/stowing path in which lies a bundle turning guide assembly. The bundle discharging means is situated generally parallel to the incline of the sorting trays and transversely discharges a copy-sheet bundle, in a direction frontward with respect to the image reproducing apparatus, from a presently adjacent one of the trays vertically shifted into a discharging position. The stowing bin, provided beneath the bundle discharging means, has a bundle-receiving platform also tilted at generally the same angle as the sorting trays. The bundle discharge/stowing path is defined by a bundle stowing guide mounted above, and broken away at a relatively slight tilt from, a standing wall of the path that is disposed generally orthogonal to the bundle-receiving platform.

The bundle stowing guide is for guiding the discharged bundles endwise between the bundle-discharging means and the standing wall, and is formed to conduct each bundle frontward as it drops toward the stowing bin in the bundle discharge/stowing apparatus. The bundle stowing guide is disposed to break linearity of the discharge/stowing path, being set at a tilt wherein it separates further off the standing wall going downward.

The bundle turning guide assembly is provided having a guide plate intersecting the bundle discharge/stowing path at an angle below the bundle stowing guide. The discharged bundle guided down the bundle stowing guide is accordingly turned toward horizontal as it leaves the bottom of the guide and passes along the guide plate of the bundle turning guide assembly.

The bundle turning guide assembly includes a pusher mechanism, operable in conjunction with a means for retracting the guide plate out of the way of the bundle as it leaves the bundle stowing guide. The pusher mechanism pushes the upper portion of the trailing end of the bundle down off the guide plate and toward the rear of the bundle discharge/stowing apparatus.

Accordingly, the bundle makes a brief free-fall, dropping properly into a stack on the bundle-receiving platform in the stowing bin. This allows the bundle to land evenly on the bundle-receiving platform and to settle smoothly under its own weight endwise alignment against the standing wall. Moreover, the bundle drops from the bundle stowing guide without tracking the standing wall. The bundle discharge/stowing thereby ensures that each bundle landing into a stack on the bundle-receiving platform will be oriented correctly, and that no bundles will straggle in stowage.

These and other objects, features, aspects and advantages of the present invention will become more fully apparent from the following detailed description of the present invention when taken in conjunction with the accompanying drawings, where like reference numerals denote corresponding parts throughout, in which:

DETAILED DESCRIPTION OF THE PREFERRED EMBODIMENT

Figure 1:
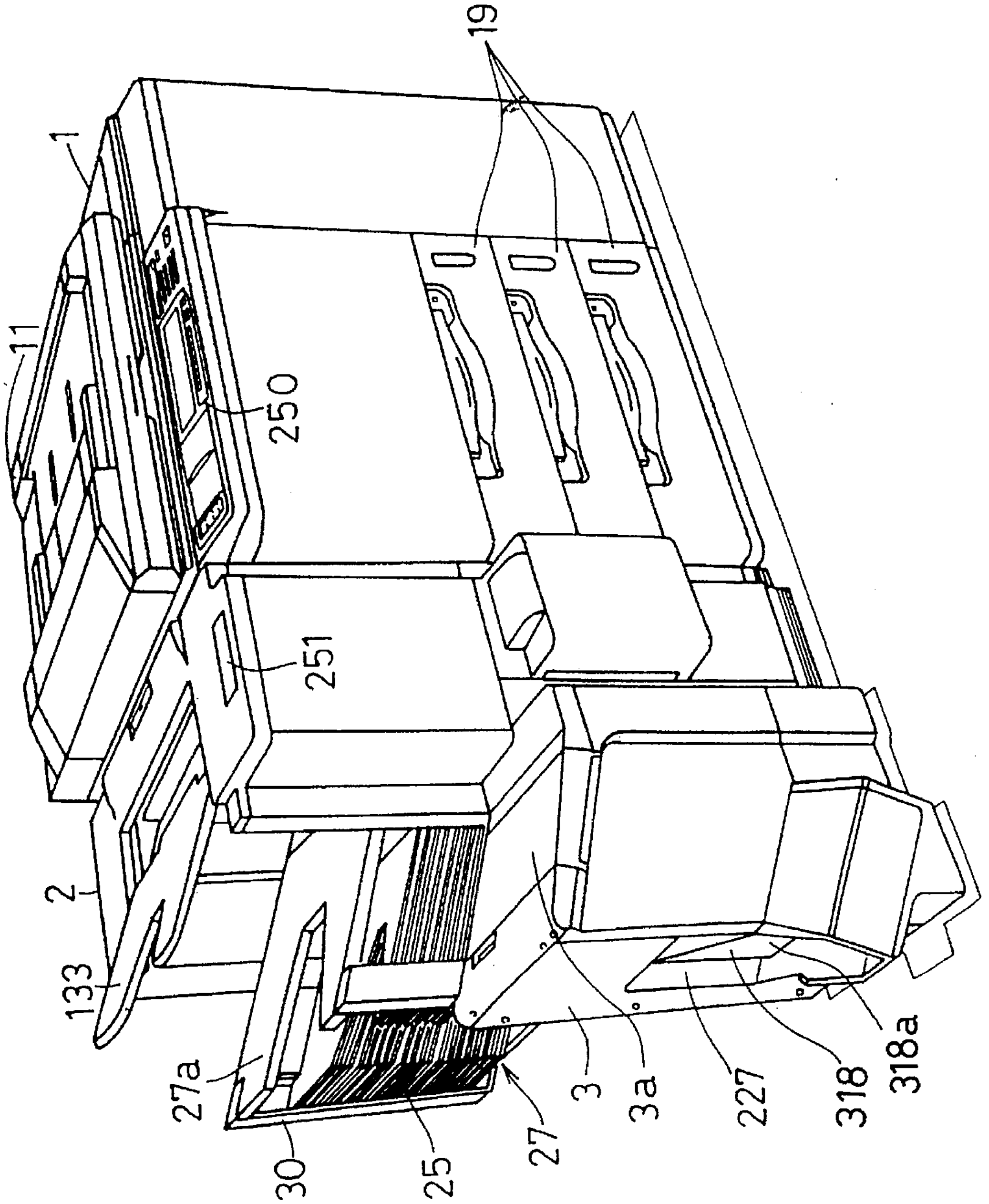
FIG. 1 is a perspective view showing a photocopying machine in an installation incorporating a preferred embodiment of the present invention.
Figure 2:
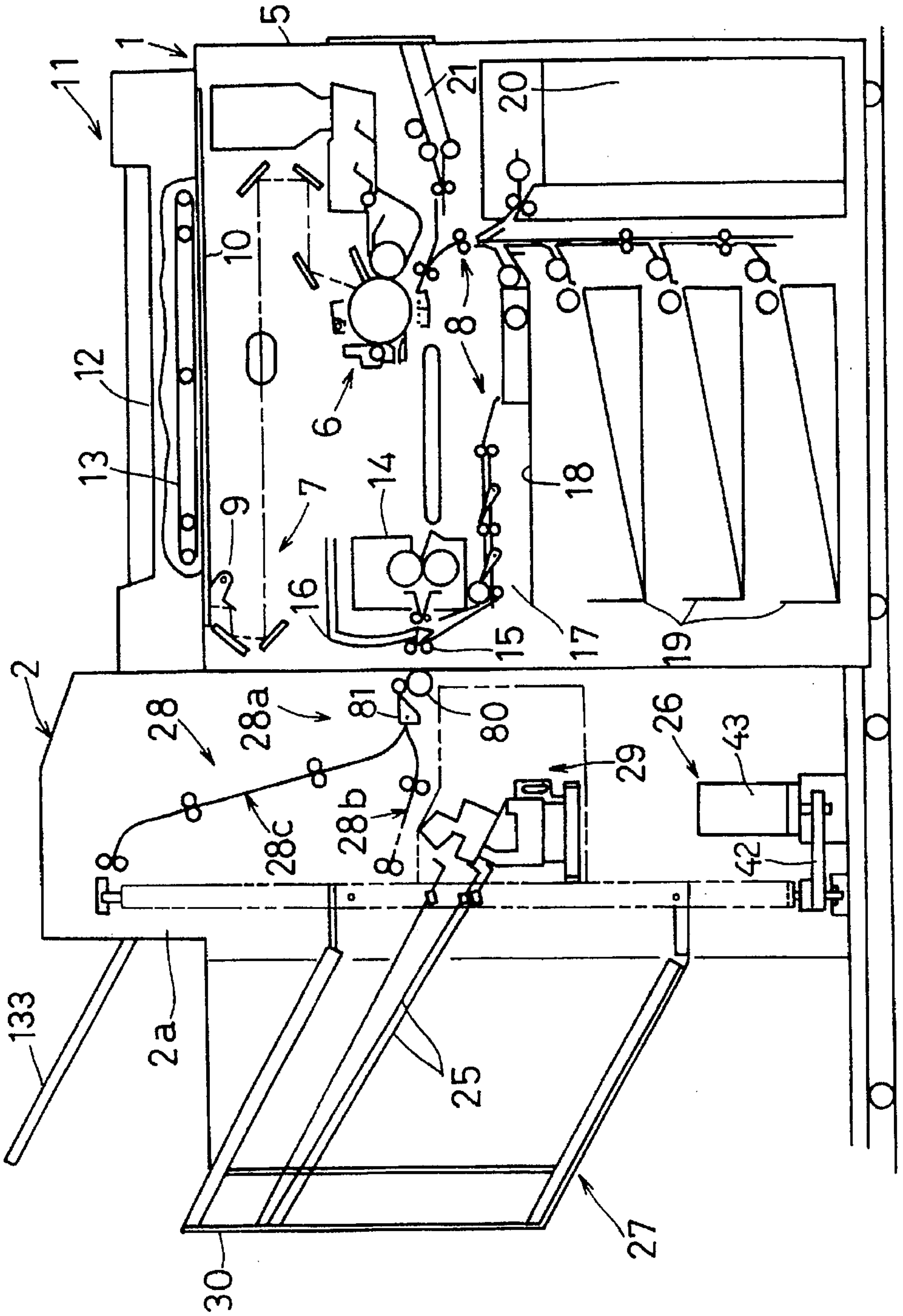
FIG. 2 is an elevation of the photocopying machine depicted in FIG. 1, which cover portions removed, which schematically illustrating one configuration of principal parts of the copying machine and of an accompanying copy sheet sorter/bundler.

FIGS. 1 and 2 illustrate the general structure of a xerographic photocopying and copy-sheet processing system in installation with a preferred embodiment of the present invention. In the description below, "front" should be understood to mean along that side of the photocopying installation as shown where an operator would stand to begin a copying operation. (Other stated locations are oriented on that basis.)

The photocopying and copy-sheet processing system chiefly comprises, with reference to FIG. 1, a copying machine 1; a sorter 2, incorporating a sheet stack bundling/processing unit, and installed on the left side of the copying machine 1; and a multi-bundle discharge/stowing unit 3 (multi-bundle stacker 3), installed on the lower front side of the sorter 2.

FIG. 2 illustrates that the copying machine 1 includes a housing 5, an image forming unit 6 disposed in a central section within the housing 5, an original scanner 7 disposed above the image forming unit 6, and a sheet transport unit 8, through which copy sheets are supplied to and discharged from the image forming unit 6.

The image forming unit 6 includes a central photoconductive drum surrounded by an associated charger, developing unit, transfer unit, paper separator, and cleaning unit.

The original scanner 7 includes an optical exposure system 9 disposed above the image forming unit 6, an original material positioning plate 10 above the optical exposure system 9, and an recirculating original-sheet feeder 11 located over the positioning plate 10. In the upper surface of a case containing the recirculating original-sheet feeder 11 is an original-sheet station 12. The original-sheet feeder 11 also incorporates an original-sheet circulating system 13, having a sheet transport belt and associated components.

The sheet transport unit 8 includes a sheet supply path to the right, and a sheet discharge path to the left, of the image forming unit 6. An image fixing unit 14, for fixing the toner-transferred image to the copy sheets, is provided in the sheet discharge path.

Discharge rollers 15, for discharging copy sheets in supply to the sorter 2, and a sheet reversing device 16, are provided on the sheet-discharge side of the fixing unit 14.

A middle transport path 17, for transporting copy sheets from the sheet reversing device 16, and a middle tray 18 for momentarily storing the sheets, are provided in a lower section of the housing 5. A plurality of feed cassettes 19 are disposed vertically beneath the middle tray 18. A feed deck 20, providing high-volume, continuous supply of fresh copy sheets, is disposed in the lower right section of the housing 5. A feed path 21 is disposed over the feed deck 20.

The sorter 2 includes a copy-sheet sorting tray unit 27 containing a plurality of trays 25; a driving mechanism 26 for shifting the trays 25 vertically; a transport unit 28 disposed between the copying machine 1 and the tray unit 27, for transporting copy sheets from the copying machine 1 to the tray unit 27; as well as a sheet stack bundling/processing device 29 (shown here having a stapling mechanism, for example) disposed below the transport unit 28 along a sheet-receiving side of the tray unit 27 (i.e., toward the copying machine 1). In the sheet-discharging side of the tray unit 27 is a support frame 30 which supports adjacent left ends of the plurality of trays 25.

Figure 3:
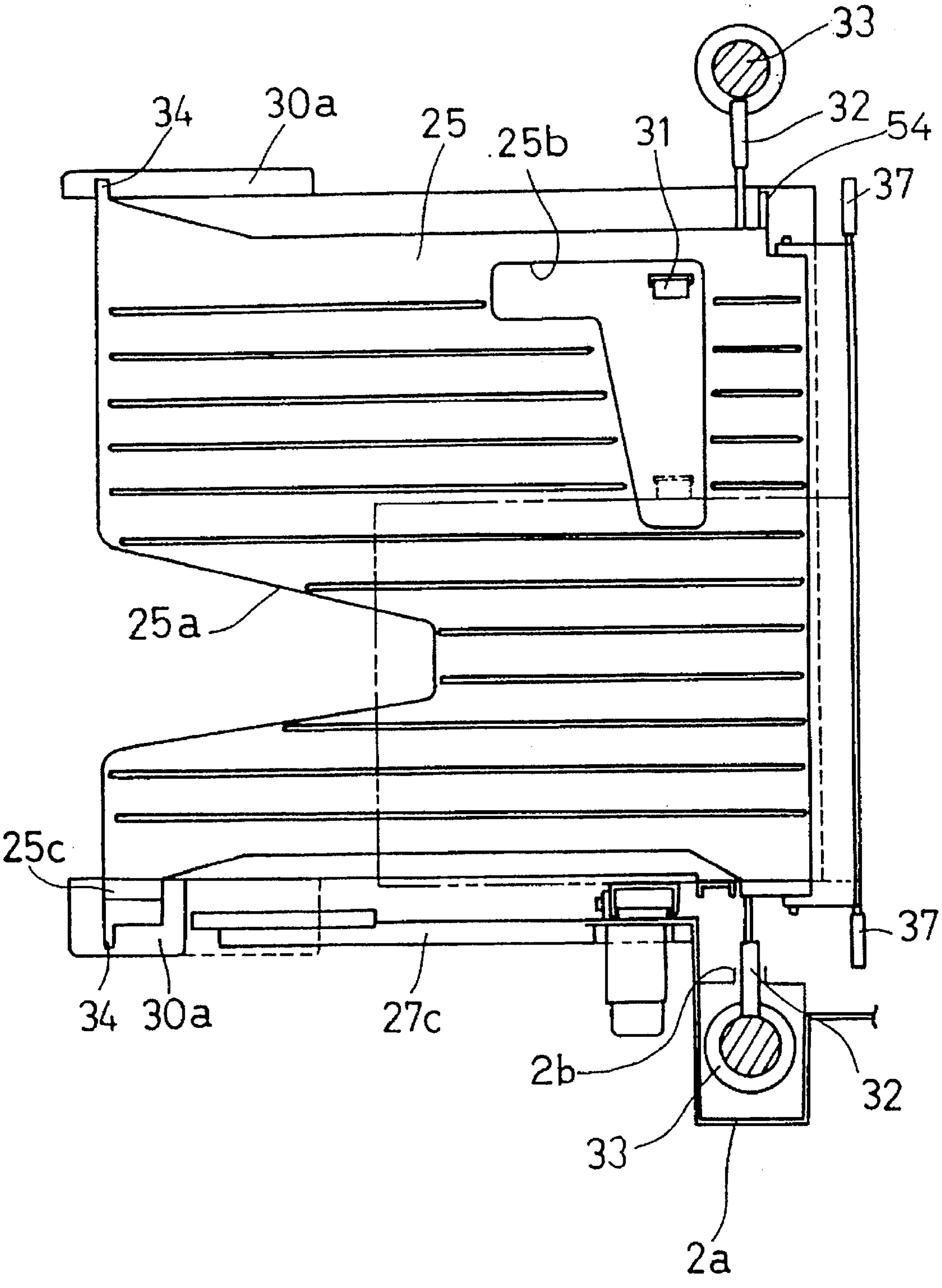
FIG. 3 is a top view of a copy-sheet sorting tray of the machine depicted in FIG. 1.
Figure 4:
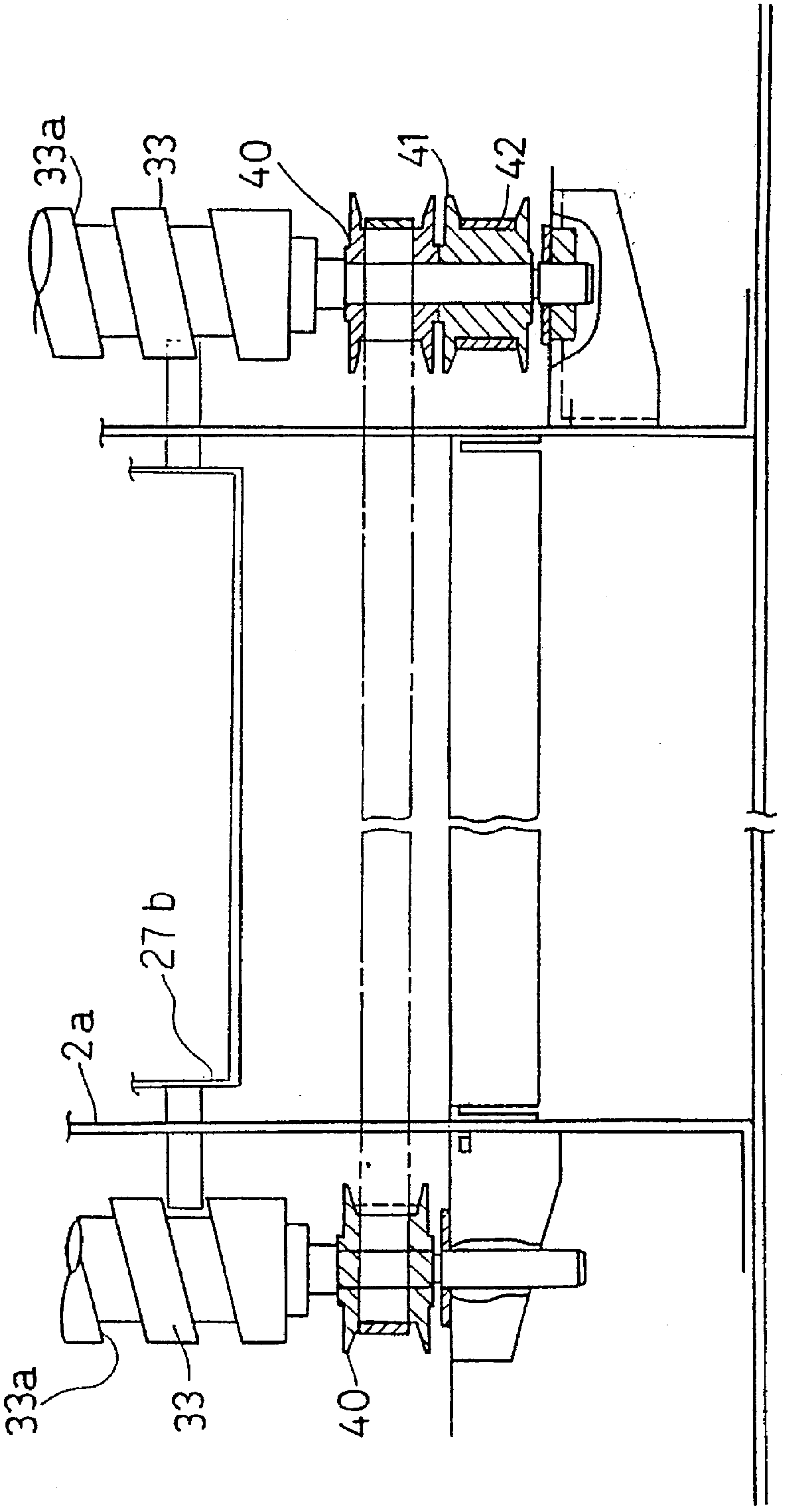
FIG. 4 is a fragmentary elevation, part section of the bottom end of a sorting tray unit drive mechanism adjacent the copying machine, with drive pulleys of the drive mechanism shown in section.

The driving mechanism 26 of the tray unit 27 includes a pair of cams 33, as shown in FIGS. 3 and 4, vertically flanking the sheet-receiving (leading) ends of the trays 25. Trunnions 32, located on opposing front and rear corners of each tray 25, as cam followers engage a helical groove **33*a* in the cylindrical surface of the adjacent respective cam 33. The top and bottom ends of each cam 33 are rotatably mounted within a frame 2*a* (FIG. 2) of the sorter 2. Fixed to the bottom end of each cam 33 is a pulley 40 (in cross-section shown enlarged in FIG. 4). A drive pulley 41 is fixed to the bottom end of the pulley 40 which is on the rear of the two cams 33. A drive motor 43 (FIG. 2) is connected to the drive pulley 41 by a belt 42** and associated elements.

The pitch of the helical grooves **33*a* varies along the length of each cam 33 equivalently. Toward either end of the cams 33 the pitch of the groove 33*a* is relatively low, spacing the trays 25 shifted into either the upper or lower area of the tray unit 27 accordingly closer together. On the other hand, the groove 33*a* pitch along the middle of each cam 33 is relatively greater, such that the trays 25, when brought opposite the mouth of the sheet stack bundling/processing unit 29**, are spaced relatively farther apart.

In the left end of each tray 25, corresponding to the copy-sheet leading edge when discharged from the copying machine 1, is a cutout **25*a* as shown in FIG. 3, to facilitate manual removal of copy sheets. Each tray is also perforated by an L-shaped aperture 25*b*, in which a copy-sheet registering element 31 is located. The registering element 31 is shiftable transversely forward, and back again within the aperture 25*b*, out of the way of a sheet stack consequently registered in the tray 25. Each aperture 25*b* extends sideways to accommodate the en bloc swing of the trays 25 toward and away from the copying machine 1 as they are shifted up and down, driven by the rotation of the cams 33**.

Tabs 34 project frontward and rearward from the corners along the sheet leading-edge end of each tray 25 (the end having the cutout **25*a*). The tabs 34 engage slots in a holder 30*a* formed in the supporting frame 30. Accordingly, the right and left ends of the trays 25 are supported, respectively, by the support frame 30 on the sheet-leading end (away from the copying machine 1), and by the cams 33 on the sheet-trailing ends of the trays 25 (adjacent the copying machine 1). Moreover, the trays 25 are accordingly inclined upward in the direction of copy-sheet discharge from the left of the copying machine 1, wherein the sheet leading edges are higher than the sheet-trailing edges. Near the front tab 34 the tray 25 is flared upward in a winged portion 25*c***.

Figure 5:
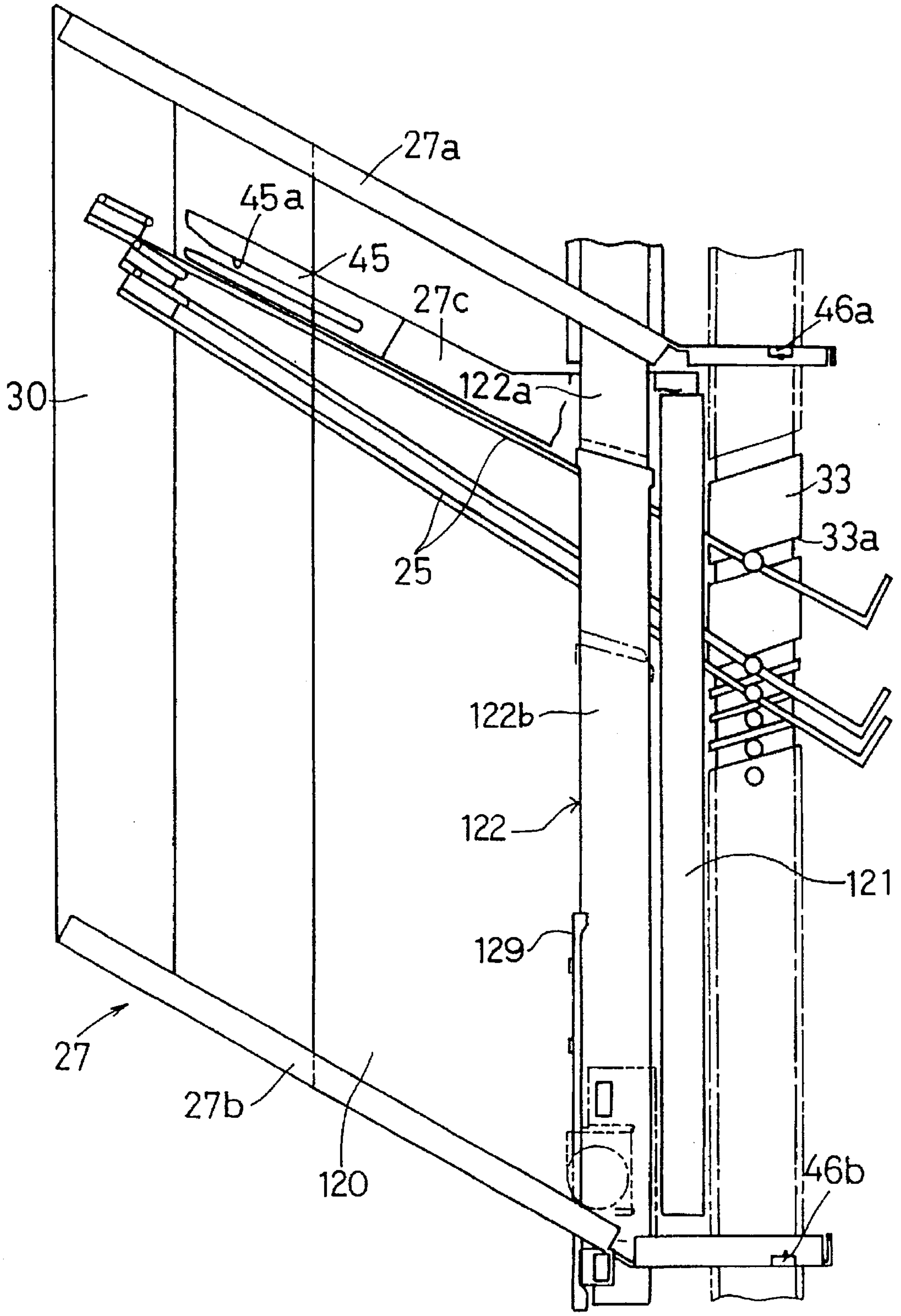
FIG. 5 is a fragmentary elevation of the sorting tray unit, and of an associated tray drive cam and sheet-stack registering plate.

Referring to FIG. 5, upper and lower frames **27*a* and 27*b* are provided at the upper and lower ends of the tray unit 27, and they share the same angle of inclination as the trays 25. A tray guide 27*c* is provided on the side of the tray 25 which directly opposes the bundling/processing device 29. The tray guide 27*c* guides the tray 25 by the winged portion 25*c* when it is taken into the copying machine 1 during the operation of the sheet bundling/processing device 29. The upper ends of the upper and lower frames 27*a* and 27*b* are fixed to the supporting frame 30, and support pins are provided on the opposite ends of the upper and lower frames 27*a* and 27*b*, toward the copying machine 1 side. More specifically, the support pins of the lower frame 27*b* are engaged with the groove 33*a* of the cam 33 (FIG. 4) and the support pins of the upper frame 27*a* are inserted into a trunnion guide groove 2*b* (FIG. 3) of the frame to support the tray unit 27. A bottom end of the tray guide 27*c*** is fixed to the end of the sorter frame 2a. The tray guide 27c extends in the sheet discharging direction along the inclination of the tray 25, and is attached to a guide member 45 in which a guide slot 45a is formed. In addition, a pair of photosensors 46a and 46b, for detecting whether there are sheets in the trays 25 or not, are provided at the ends of the upper and lower frames 27a and 27b on the sheet supply side.

Figure 6:
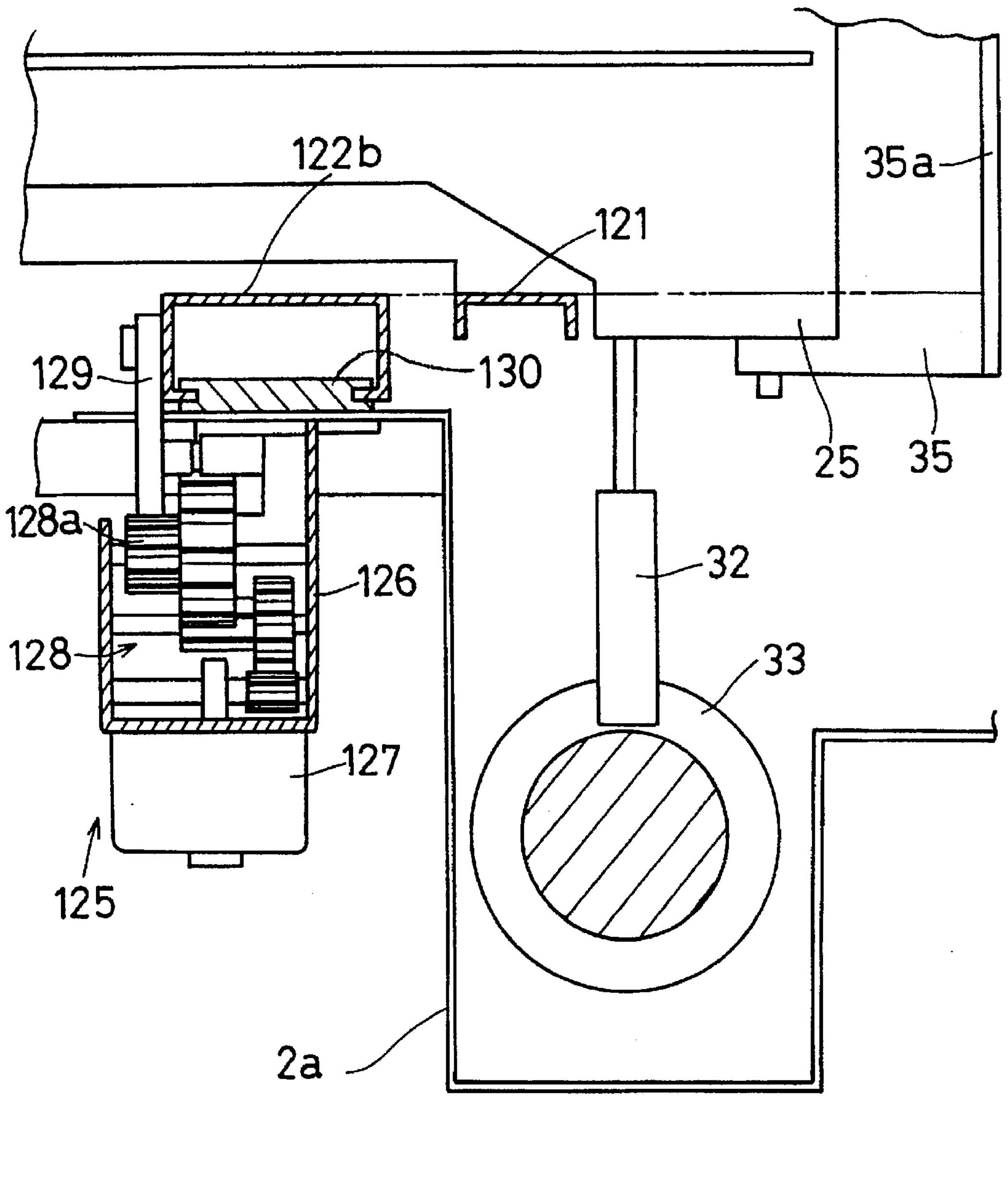
FIG. 6 is a fragmentary, part section, part elevation of a portion of FIG. 3, on an enlarged scale, showing, in section, a drive gear train in a drive mechanism for the sheet-stack registering plate.

The sorter 2 has openings 120 (FIG. 5) on its front and rear sides between the support frame 30 and the sorter frame 2a (FIGS. 3 and 6). A registering stationary member 121 for lateral registration of the sheets, and a registering shutter member 122, are provided along the front of the tray unit 27 toward the copying-machine end of the sorter frame 2a. The registering members 121 and 122 are disposed succeeding the adjacent cam 33 in the sheet discharging direction. The registering shutter member 122 comprises a fixed support 122a and a vertically movable shutter 122b. The shutter 122b is movable between a closed position, indicated by a solid line in FIG. 5, and an opened position, indicated by a dashed line in the figure. The shutter 122b opens to expose the side of that tray 25 momentarily in position for bundle discharge, which is the one just below the tray 25 which is opposite the bundling/processing device 29. Distinguishing a tray for bundle discharge separate from a tray for bundling/processing allows for parallel operation of the multi-bundle discharge/stowing unit 3 and the bundling/processing device 29.

Referring to FIG. 6, a lifting mechanism 125 for operating the shutter 122b is provided in the bottom end of the sorter frame 2a. The lifting mechanism 125 includes a frame 126 attached to the sorter frame 2a, a motor 127 fixed to the frame 126, and a gear train 128 rotatably supported in the frame 126. The gear train 128 is driven by the motor 127, and a pinion 128a of the gear train 128 is engaged with a rack 129 fixed to the lower reference plate 122b.

Thus, the registering shutter member 122, guided by a slider guide 130 fixed to the sorter frame 2a, is shifted up and down by the motor 127, in tandem with the rack 129.

The cam 33 and the registering members 121 and 122 are configured for overall compactness of the tray unit 27 of the sorter 2 in the preferred embodiment of the invention. Specifically, in the sorting unit the stop gates 35, having the standing walls 35a as the sorting tray 25 ends, are pivotal, swinging down out of the way as the corresponding tray 25 is drawn into the bundling position within the sheet-stack bundling/processing unit 29. Accordingly, the cams 33 are disposed downstream (in the sheet-discharging direction) from the tray 25 ends, and though the registering members 121 and 122 are located in close proximity to the forward of the cams 33, the registering members 121 and 122 are yet in position along the middle of the sheets lengthwise to function effectively in registering the stacks.

On the other hand, since the registering members 121 and 122 stand close to the forward cam 33, the sorter frame 2a can be of minimized dimension, since it need not extend toward the ends of the trays 25. Furthermore, the location adjacent the sorter frame 2a, of the shutter 122b, together with the associated lifting mechanism 125, and for driving it also contributes to reduced dimension of the sorter 2.

As shown in FIG. 2, the transporting unit 28 of the sorter 2 includes an inlet portion 28a, a transporting route 28b for sorting, and a transporting route 28c for non-sorting, which diverge from the inlet portion 28a. A guide roller 80 and a fork 81 are provided at the inlet portion 28a. The transporting route 28b is provided between the inlet portion 28a and the trays 25 for sorting and it transports sheets onto that tray 25 whose the clearance above which has been made greatest by the cams 33. The transporting route 28c, for transporting sheets in the non-sorting mode to tray 133, is provided between the tray 133 and the inlet portion 28a.

Multi-Bundle Discharge/Stowing Device

Figure 7:
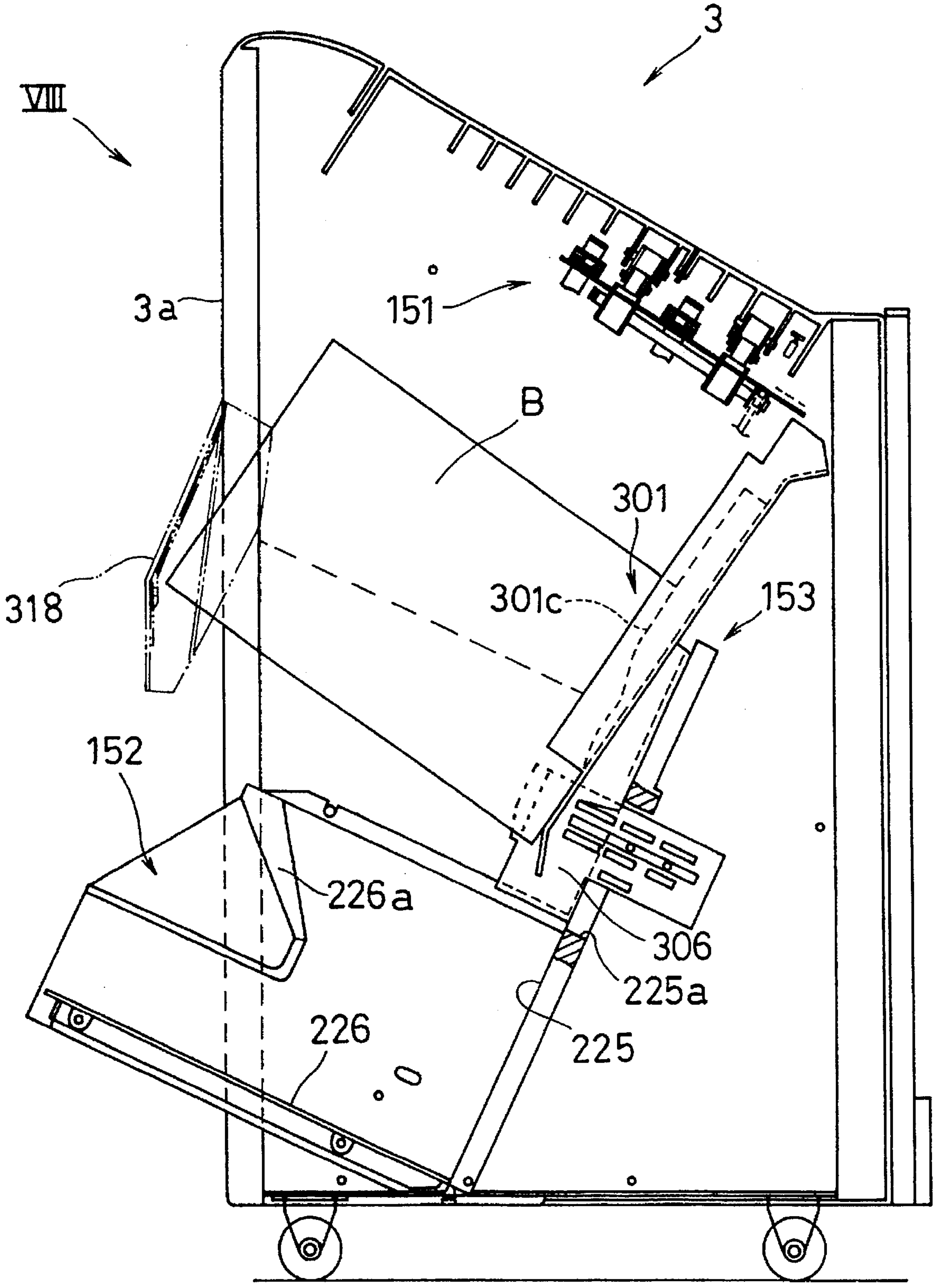
FIG. 7 is an elevation of the copying machine installation showing a sheet-bundle multiple discharge and stowing unit as seen from the operator side (front)
Figure 8:
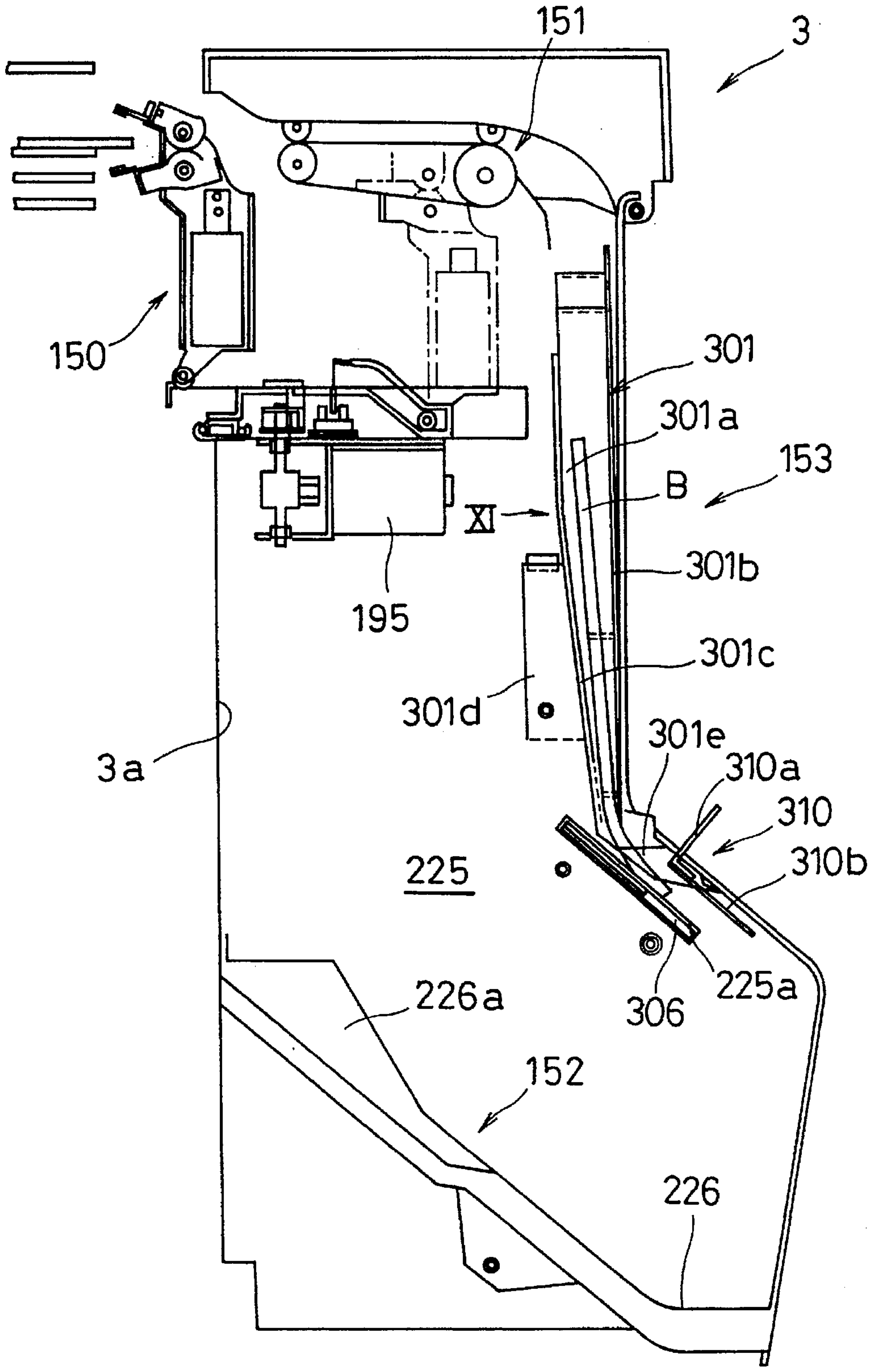
FIG. 8 is a part elevation, part section of the sheet-bundle multi-discharge/stowing unit,seen from the direction of arrow VIII in FIG. 7, with a sheet-bundle withdrawing claw mechanism of the unit shown about to grab a copy-sheet bundle, and wherein phantom lines correspondingly indicate the claw mechanism retracted into a bundle discharging position.

FIGS. 7 and 8 show the overall structure of the multi-bundle discharge/stowing unit 3. FIG. 7 is a front view, and FIG. 8 is a side view seen from the direction of arrow Z in FIG. 7, of the multi-bundle stacker 3.

The multi-bundle stacker 3 is housed in a case 3a and includes a sheet-bundle withdrawing (stacker) claw mechanism 150, a bundle discharging mechanism 151 for discharging the bundles withdrawn by the claw mechanism 150, a stowing bin 152 in which the discharged bundles are housed, and a bundle discharge/stowing path 153 for guiding the bundles withdrawn from the trays 25 into the stowing bin 152. The claw mechanism 150 grasps a copy-sheet bundle in that of the trays 25 shifted presently into the withdraw position and discharges the bundle into the stowing bin 152.

Figure 9:
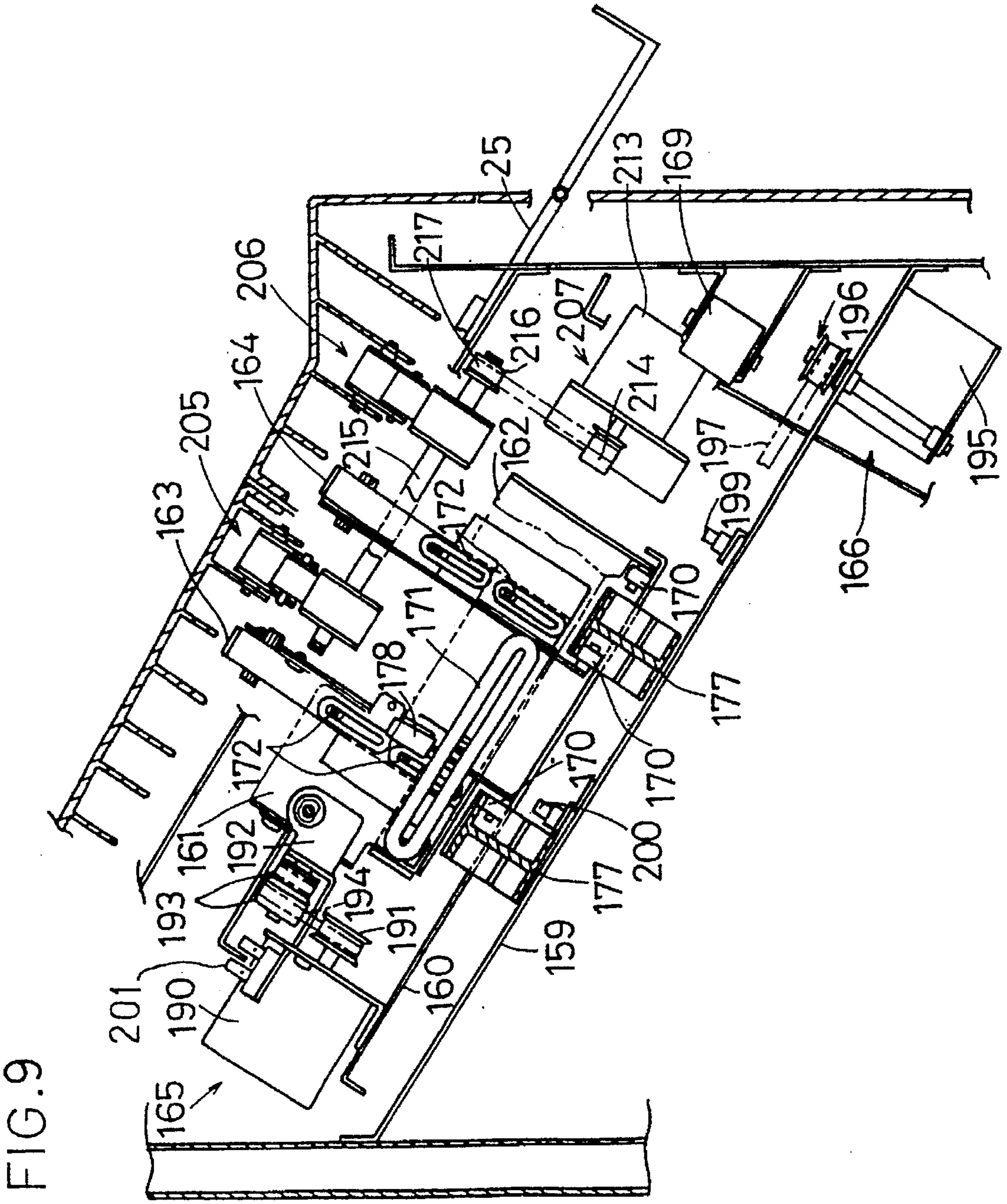
FIG. 9 is a fragmentary, part section, part elevation showing the claw mechanism seen from the front in enlarged detail.
Figure 10:
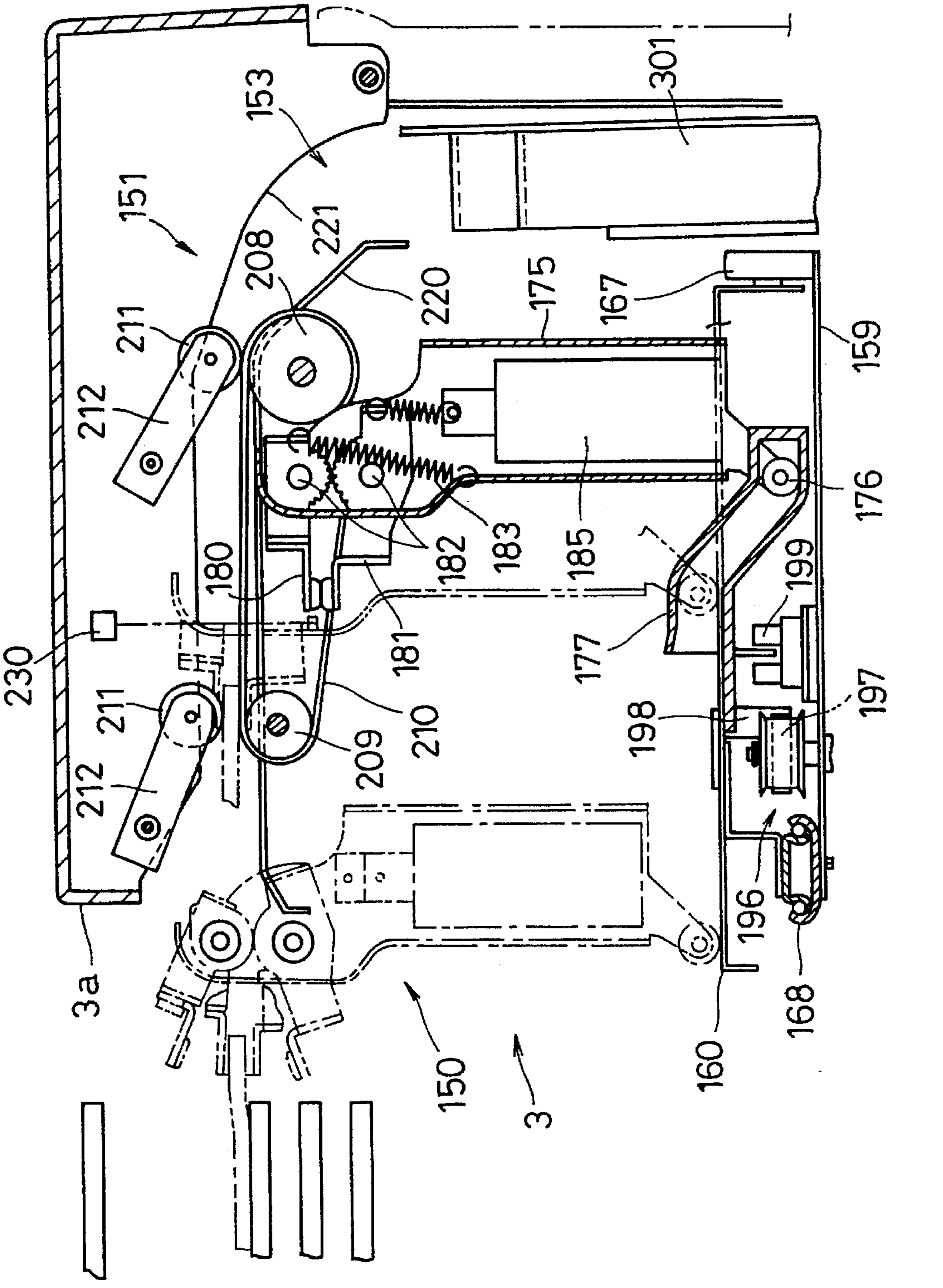
FIG. 10 is a fragmentary, part elevation, part section enlargement of a portion of FIG. 8, illustrating details of a sheet-bundle discharging mechanism of the sheet-bundle multi-discharge/stowing unit, wherein phantom lines indicate the claw mechanism in the positions of FIG. 8, and solid lines show the claw mechanism retracted into a home position.

Referring to FIGS. 9 and 10, which are enlarged views of corresponding portions of FIGS. 7 and 8, the stacker claw mechanism 150 includes a base 159, a shifting table 160 for shifting the base 159 transverse to the bundle withdrawing direction of the claw mechanism 150, first and second claw mounting plates 161 and 162 provided on the shifting table 160 so as to be movable in the front-to-rear direction of the machine, first and second claws 163 and 164 mounted on the mounting plates 161 and 162, respectively, a first drive mechanism 165 for shifting the claws 163 and 164 in the front-to-rear direction, and a second drive mechanism 166 for shifting the shifting table 160 in the stated transverse direction. The first claw-mounting plate 161 is checked against transverse movement relative to the shifting table 160, while the second claw mounting plate 162 is transversely movable on the shifting table 160.

The base 159 is inclined at generally the same angle as the trays 25. A roller 167 is provided at the end of the shifting table 160 on the front side of the machine as shown in FIG. 10, and a trundle guide 168 for trundling the plate 160 transversely is disposed along the opposite end. The shifting table 160 is shifted by the second drive mechanism 166 toward and away from the copying machine 1. The second claw mounting plate 162 is stopped in abutment against a stopper roller 169, further provided at the end of the sorter 2 on the copying machine 1 side. A roller 170 is provided under each of the claws 163 and 164, and the second claw mounting plate 162, which moves on the shifting table 160 in the front-to-rear direction of the machine. A first slider guide 171 having a transverse guide groove is fixed to the second claw mounting plate 162. The first claw mounting plate 161 includes a catch for catching the slider guide 171.

Each of the claws 163 and 164 is mounted in a claw frame 175. The rollers 170 are provided on the bottoms of the claw frames 175. The claw frames 175 are vertically shiftable along second slider guides 172 disposed vertically on each of the claw mounting plates 161 and 162. Additionally, claw guides 177 are provided on the shifting table 160. The claw guides 177 guide the roller 170 of each of the retracting claws 163 and 164 downward, whereby the upper portions of the claws 163 and 164 can retreat into (under) the bundle discharge/stowing path 153. A sensor 178 for detecting that the first claw 163 has moved away from the second claw 164 a predetermined distance is fixed to the second claw mounting plate 162.

Referring to FIG. 10, each of the claws 163 and 164 includes a pair of upper and lower grips 180 and 181. Each of the grips 180 and 181 is rotatably supported to the claw frame 175 on a support pin 182. Correspondingly meshing geared portions are formed on the underside of the base of the upper grip 180 and on the top of the base of the lower grip 181. The rear end of the upper grip 180 is compelled open by a spring 183. One end of a spring 184 is held by the rear end of the lower grip 180, and the other end thereof is held by an end of the plunger of a solenoid 185 mounted to the claw frame 175. Accordingly, when the solenoid 185 is off, the upper grip 180 is opened upward by the spring 183 and the lower grip 181 is opened downward. Conversely, when the solenoid 185 is turned on and the plunger retracts, the lower grip 181 is rotated by the spring 184 so as to be closed, turning the upper grip 180 so as to be closed, against the impelling force of the spring 183.

The first drive mechanism 165 includes a motor 190, a gear pulley 191 fixed to an end of the motor 190, a plurality of gear pulleys 193 fixed to a connecting member 192 of the first mounting plate 161, and a timing belt 194 extending around each gear pulley. Thus, when the motor 190 rotates, the connecting member 192 is moved by the timing belt 194, and the two claws 163 and 164 are moved in the front-to-rear direction upon the claw mounting plates 161 and 162.

The second drive mechanism 166 includes a motor 195 fixed to the lower surface of the base 159, a gear train 196 (referring to FIG. 10) comprising a plurality of gear pulleys, and a timing belt 197. The timing belt 197 is connected to a catching portion 198 fixed to the lower surface of the shifting table 160.

Photointerrupters 199 and 200 for detecting the position of the shifting table 160 are disposed on the base 159 at a predetermined interval. In addition, a photointerrupter 201 for detecting that each of the claws 163 and 164 is placed at its home position is provided on the shifting table 160.

The discharging mechanism 151 includes a pair of roller units 205 and 206, and a roller drive mechanism 207 for driving the roller units 205 and 206.

As shown in FIG. 10, the roller units 205 and 206 comprise a drive roller 208 and a follower roller 209 disposed along the bundle discharge/stowing path 153. A belt 210 for transporting the processed copy-sheet bundles extends between both rollers 208 and 209. A pressing roller 211 is disposed above the rollers 208 and 209. The pressing roller 211 is rotatably mounted to the end of the supporting member 212. The supporting member 212 is rotatably mounted to the case 3*a* covering the upper portion of the multi-bundle discharge/stowing unit 3.

The roller drive mechanism 207 includes a motor 213, a gear pulley 214 mounted to the end of the motor 213, a rotation rod 215 connecting the drive rollers 208 of the roller units 205 and 206, a gear pulley 216 fixed to the end of the rotation rod 215, and a timing belt 217 extending between both pulleys 214 and 216.

The bundle discharge/stowing path 153 chiefly comprises a standing wall 225 and a bundle stowing guide 301 supported on the standing wall 225. The standing wall 225 is tilted at an angle approximately orthogonal to the incline of the trays 25, as shown in FIG. 7, thereby following the adjacent trailing end of the copy-sheet bundle in discharge from a tray 25 into the path 153.

Figure 11:
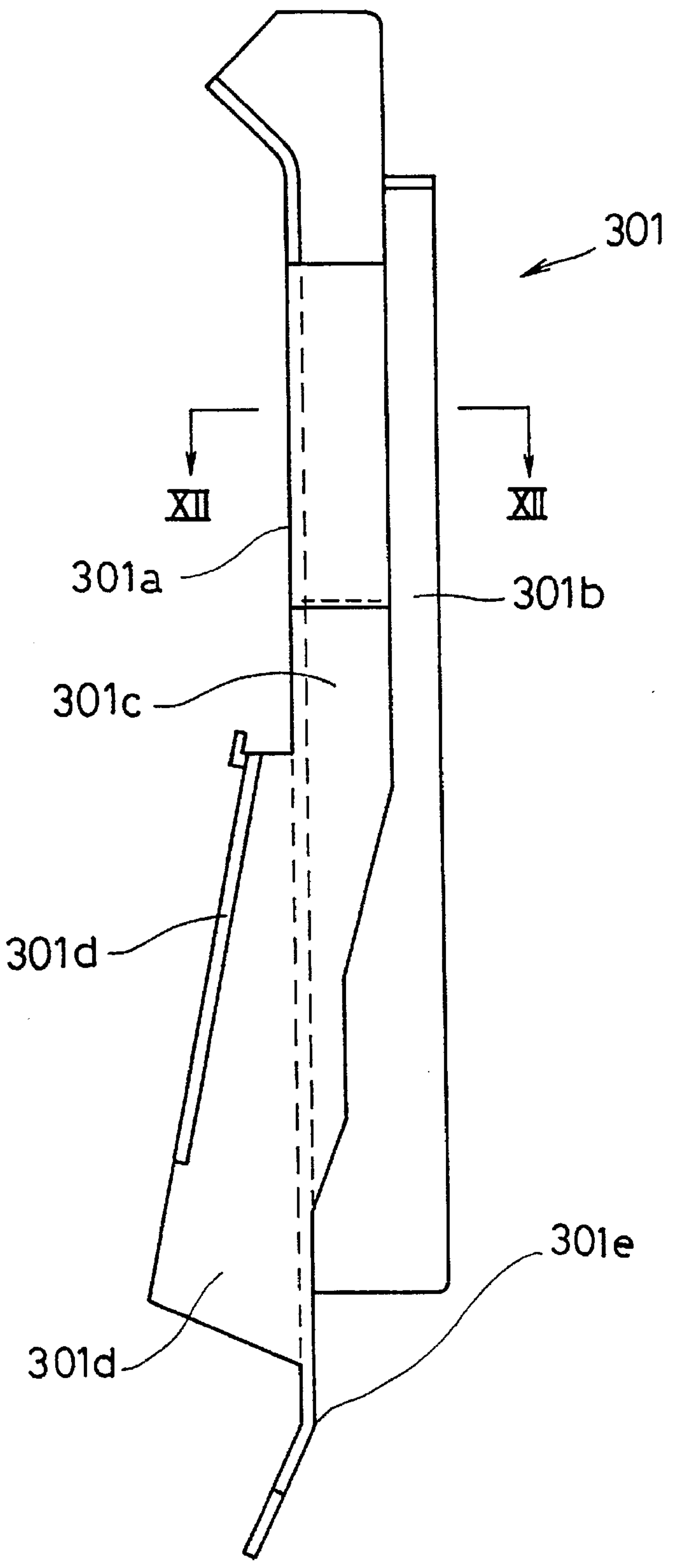
FIG. 11 is a rear view of a bundle-stowing guide, seen from the direction of arrow XI in FIG. 8, and shown removed from the sheet-bundle multi-discharge/stowing unit.
Figure 12:
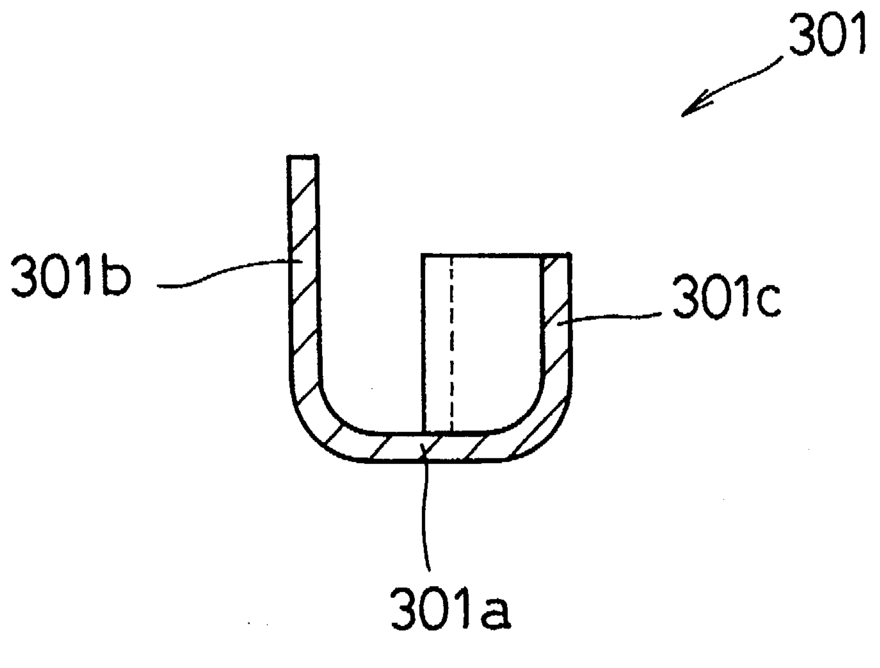
FIG. 12 is a section of the bundle-stowing guide, taken along the line XII—XII of FIG. 11, shown with lower portions of the guide removed.

With reference to FIGS. 11 and 12, the bundle stowing guide 301 is roughly U-shaped in cross section along its upper extent, defining a channel having a channel wall 301*a*, a front wall 301*b*, and a rear wall 301*c* that is shorter, with respect to the channel wall 301*a*, than the front wall 301*b* and that tapers in stages toward and into the channel wall 301*a*. The rear wall 301*c* moreover angles downward, (as can be seen in FIG. 8), toward the front wall 301*b*. Further, extending from the channel portion of the bundle stowing guide 301 is a mounting leg 301*d* that flares out in the direction along the rear wall 301*c*, having a perpendicularly extending foot portion mounted to the standing wall 225. A lower guide extension 301*e* projects away from the bottom end of the channel wall 301*a*. (Note that the mounting leg 301*d* and the lower guide extension 301*e* have been removed from FIG. 12 for clarity).

As will be recognized from FIG. 7, the configuration of the bundle stowing guide 301 is such that when mounted, the guide 301 is inclined at an angle more acute, with respect to horizontal, than is the standing wall 225. Accordingly, the channel wall 301*a* is held separated off from the standing wall 225. In particular, toward the lower reach of the bundle stowing guide 301, i.e., downstream in the direction of sheet-bundle discharge, the guide 301 is tilted away from the standing wall 225. Accordingly, the bundle discharge/stowing path 153 is broken midway, such that a bundle discharged into the bundle stowing guide 301 momentarily can drop freely before settling in place onto a bundle-receiving platform 226 of the stowing bin 152 (described later).

Furthermore, as shown in FIG. 8, the bundle stowing guide 301 itself is mounted at a slight tilt, such that the lower end of the guide 301 is positioned closer to the front of the multi-bundle stacker 3 (toward the right in FIG. 8) than the upper end.

Figure 13:
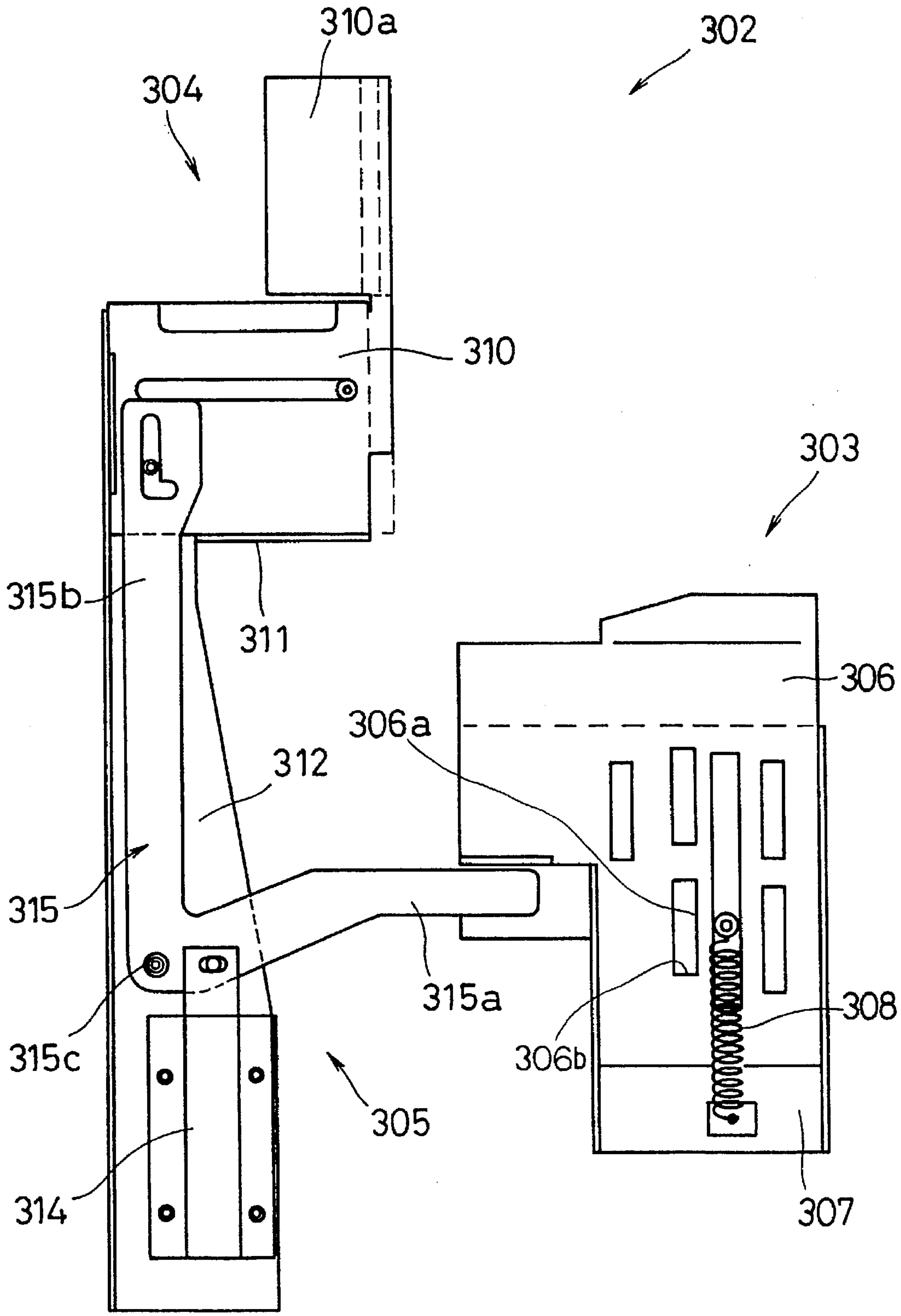
FIG. 13 is an oblique projection of a bundle turning guide assembly, seen in the direction of a turn in a copy-sheet bundle discharge path of the sheet-bundle multi-discharge/stowing unit.

A bundle turning guide assembly 302, illustrated in FIG. 13, is provided beneath the bundle stowing guide 301. FIG. 13 shows the principal parts of only the bundle turning guide assembly 302 itself, as they would appear in situ along the bundle discharge/stowing path 153 in the multi-bundle stacker 3.

The guide assembly 302 chiefly comprises a receiving guide 303, a pusher mechanism 304, and a linking mechanism 305 cooperative between and coupling the receiving guide 303 and the pusher mechanism 304. (Note that in FIG. 13, the pusher mechanism 304 appears together with the linking mechanism 305 in an orthographic elevation, whereas the receiving guide 303 is shown in a foreshortened axonometric projection.)

The receiving guide 303 primarily includes a guide plate 306 and a guide support 307 slidably supporting the guide plate 306 for unidirectional movement. The guide plate 306 and the guide support 307 are elastically connected by a coil spring 308, that impels the guide plate 306 upward in the context of FIG. 13. As shown in FIG. 7, the guide plate 306 protrudes through a slit 225*a* formed in the standing wall 225 (i.e., through the bundle discharge/stowing path 153). As shown in FIG. 8, the guide plate 306 lies at an incline such that its lower end is positioned closer to the front of the multi-bundle stacker 3.

The pusher mechanism 304 chiefly comprises a pushing element 310 and a support 311 slidably supporting the pushing element 310 for unidirectional movement. A plate 310*b* is fixed to a pushing portion 310*a* of the pushing element 310, as shown in FIG. 8.

The linking mechanism 305 primarily includes a base 312, a solenoid 314 fixed to the base 312 and a linking lever 315 coupled to the solenoid 314 plunger. The linking lever 315 is L-shaped as can be seen from FIG. 13, and has first and second lever arms 315*a* and 315*b*. The linking lever 315 is pivotally mounted to the base 312 on a pin 315*c*. The lever arm 315*a* is inserted in an opening 306*a* of the guide plate 306 of the receiving guide 303. A tip of the second lever 315*b* is coupled to the pushing element 310.

The solenoid 314 as shown in FIG. 13 is in the off state, wherein the plunger is extended- When the solenoid 314 is turned on, withdrawing the plunger, the linking lever 315 pivots around the pin 315*c* clockwise (in the context of FIG. 13). As the linking lever 315 pivots, the end of the lever arm 315*a* catches the edge, marked 306*b* in the figure, of a slot 306*a* in the guide plate 306 in a cooperative engagement. Consequently the guide plate 306 is drawn toward the copy machine 1, against the force of the spring 308; i.e., the guide plate 306 retracts into the standing wall 225 (FIG. 7).

Simultaneously the pivoting lever arm 315*b* impels the pusher 310 to shift unidirectionally. Specifically, the pusher 310 is moved diagonally backward in the multi-bundle stacker 3, in the context of FIG. 8.

Referring to FIG. 7, the stowing bin 152 is provided in a lower portion of the case 3*a*. The bundle-receiving platform 226 of the stowing bin 152 is generally perpendicular to the standing wall 225, together with the bundle stowing guide 301 defining the bundle discharge/stowing path 153. As can be seen in FIG. 8, the receiving platform 226 extends backward and inclines upward in the multi-bundle stacker 3. The receiving platform 226 extends toward, in a plane orthogonal to, the front side of the stowing bin 152, forming a bed portion lying at greatest distance from the guide 301.

The receiving platform 226 is formed with a rear guide feature 226*a*. The guide feature 226*a* is a projection that inclines down toward the standing wall 225 such that bundles discharged onto the receiving platform 226 are guided to slide back toward the standing wall 225.

Figure 14:
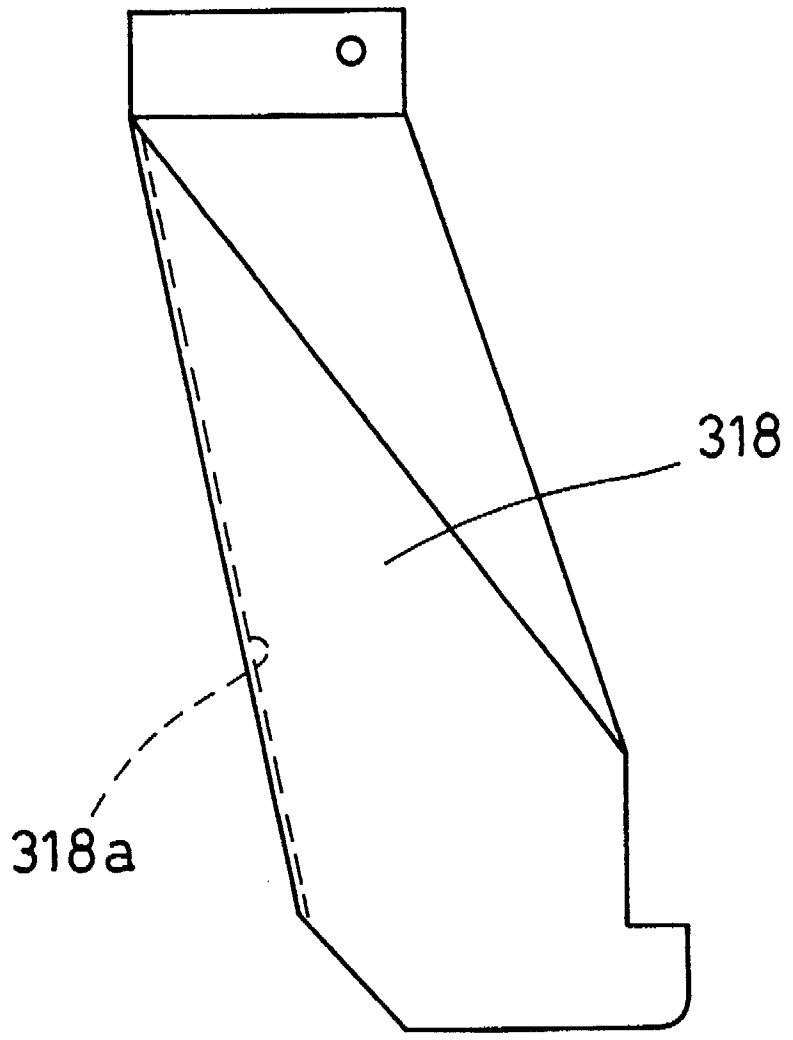
FIG. 14 is a front view of a guide apron shown removed from the mouth of a stowing bin of the sheet-bundle multi-discharge/stowing unit.

The multi-bundle stacker 3 has a side opening 227, as is shown also in FIG. 1, for the discharging of stowed bundles. A guide apron 318, shown separately in FIG. 14, is mounted along the upper end of the opening 227. The guide apron 318 is formed having a primary guide surface 318*a*, extending beneath the plane of FIG. 14. The primary guide surface 318*a* is inclined such that its lower portion is nearer the front of the multi-bundle stacker 3 than its upper portion. The inner surface of the guide apron 318, then, and in particular the primary guide surface 318*a*, catches and guides the leading-edge corner of the bundles in discharge, conducting them forward in the multi-bundle stacker 3. Thus, the primary guide surface 318*a* and the guide plate 306 function likewise, both the guide elements together constituting a copy-sheet bundle endwise receiving and guiding means.

Since the multi-bundle discharge/stowing device 3 is provided with the stowing bin 152 having the side opening 227, bundles can be discharged from the stowing bin 152 even during the bundle discharge/stowing operation from the sorter 2 into, the multi-bundle stacker 3. When in need of an especially great number of copies of a document stack, moreover, operations in respective parts of the photocopying installation can be temporarily interrupted when the stowing bin 152 has become fully loaded with bundles. The bundles are then discharged from the stowing bin 152 mid-process, in handling an ongoing high-volume copying operation.

Control Unit

As shown in FIG. 1, a copier operation panel 250 for operating the copying machine 1 is provided on the upper surface of the copying machine 1 on the front side thereof. The copier operation panel 250 includes a key selecting a sorting or non-sorting mode, a key selecting a stapling or non-stapling mode, a key selecting a punching or non-punching mode (of the sheet-stack bundling/processing unit 29), a key selecting a stapling position or punching position, decimal keys setting the number of copies, and other keys.

On the upper front side of the sorter 2 a sorter operation panel 251 is disposed, through which an operator directly inputs a command to the sorter 2. The sorter operation panel 251 includes a keyboard through which stapling and punching operations, and an operation for taking the bundled copy sheets from the trays 25 in parallel, are designated, and includes other associated keys. The stacked sheets in the tray can be compulsorily discharged to the stowing bin 152 through a keyboard command as well.

Figure 15:
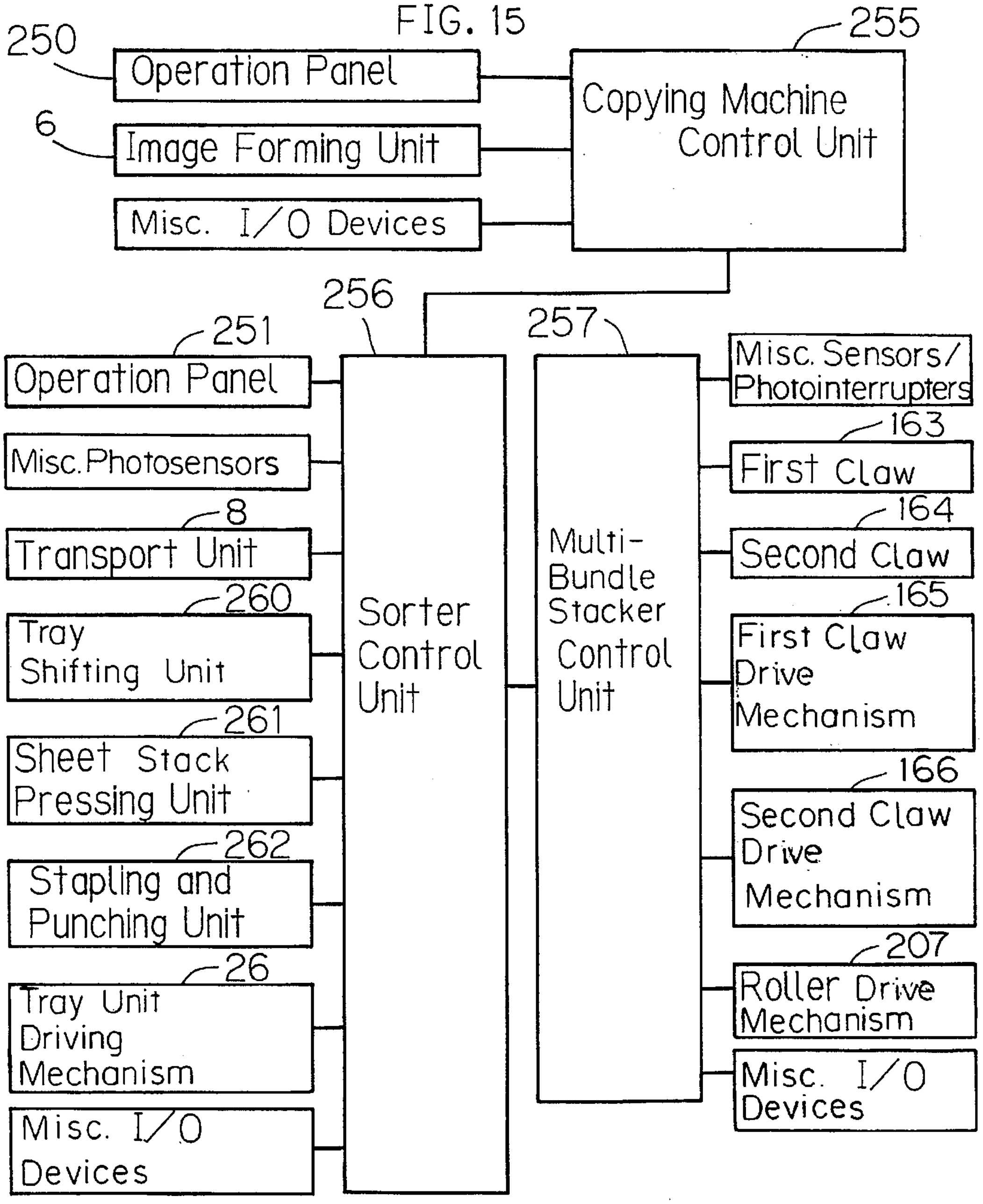
FIG. 15 is a block diagram illustrating a control system of the photocopying machine installation.

FIG. 15 is a schematic block diagram of a control system for the copying machine 1 in installation with the sorter 2 and multi-bundle stacker 3.

The copying machine 1 includes a copying machine control unit 255 controlling the photocopying processes within the copying machine 1, as well as the operation of the recirculating original-sheet feeder 11; the sorter 2 includes a sorter control unit 256; and the multi-bundle discharge/stowing device 3 includes a multi-bundle stacker control unit 257. Each of the control units 255, 256 and 257 includes a microcomputer comprising a CPU, a RAM, and a ROM. The control units 255, 256 and 257 are connected through a bus, whereby various data can be exchanged among the control units.

Connected to the copying machine body control unit 255 are the copier operation panel 250, the image forming unit 6, as well as other I/O devices.

Connected to the sorter control unit 256 are the sorter operation panel 251, the photosensors 46*a* and 46*b*, the sheet transport unit 8, a tray shifting unit 260 for moving the trays 25 sideways in the direction of copy sheet discharge from the copying machine 1, a sheet stack pressing unit 261 for pressing copy sheet stacked in the trays 25, a stapling and punching unit 262 (part of the sheet-stack bundling/processing unit 29), the driving mechanism 26 for the sorting tray unit 27, for vertically shifting the trays 25, and other I/O devices. Connected to the multi-bundle discharge/stowing device control unit 257 are various sensors (including the sensor 178 mentioned previously, as well as a photointerrupter 230, mentioned below), the first and second claws 163 and 164, the first (claw) drive mechanism 165 for shifting the claws 163 and 164 in the front-to-rear direction, the second (claw) drive mechanism 166, for shifting the claws 163 and 164 transversely, the roller drive mechanism 207, and other I/O devices.

Operation of Copying Machine

Figure 16:
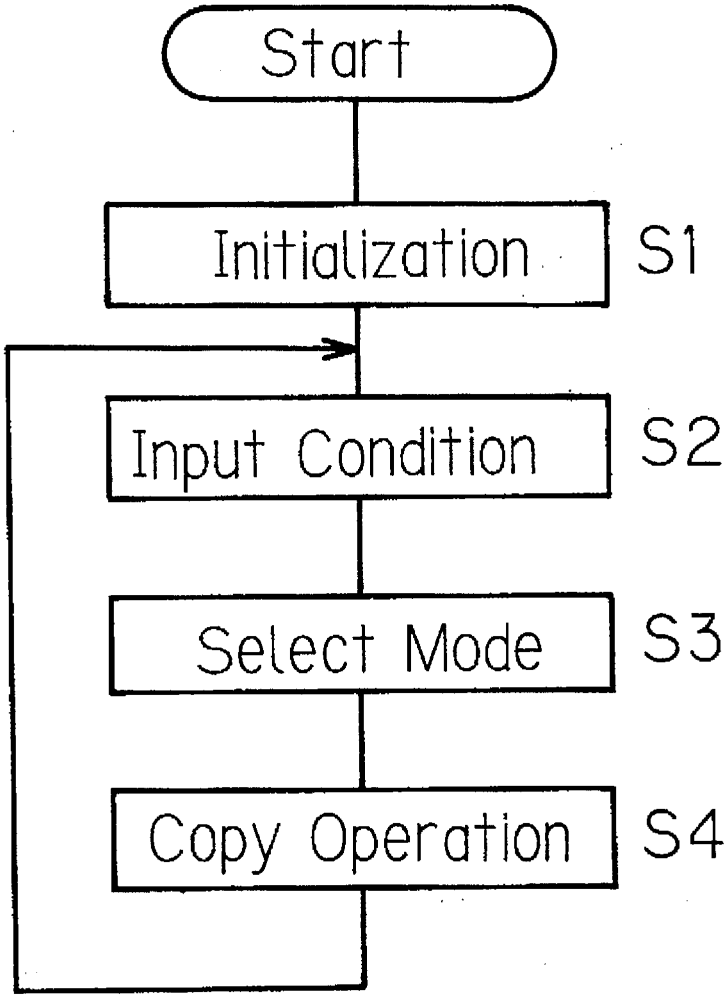
FIG. 16 is a flow chart illustrating the control system of the copying machine.

In the copying machine 1, an initialization procedure is carried out at step S1 in FIG. 16, wherein, for example, the number of copies is set to "1". In the initialization procedure, the non-sorting mode, the non-stapling mode and the non-punching mode are set.

Then, at step S2, a conditional input operation such as receiving input setting the number of copies is carried out. At step S3, a mode selecting operation to be described later is carried out. At step S4, a command for starting the copying operation through a print button is received. When the command for starting the copying operation is made, the copying operation is carried out by controlling the image forming unit 6 and the recirculating original-sheet feeder 11. During the copying operation, a sheet is transported from a feeding cassette 19 or a feeding deck 20 to the image forming unit 6 and then, a toner image is transferred onto the sheet in the image forming unit 6. Then, the image on the sheet is fixed by the fixing unit 14 and introduced to the inlet 28 of the sorter 2 by the discharge rollers 15. The Operation performed in the sorter 2 will be described later. After the copying operation is finished at step S4, the program returns to step S2.

Figure 17:
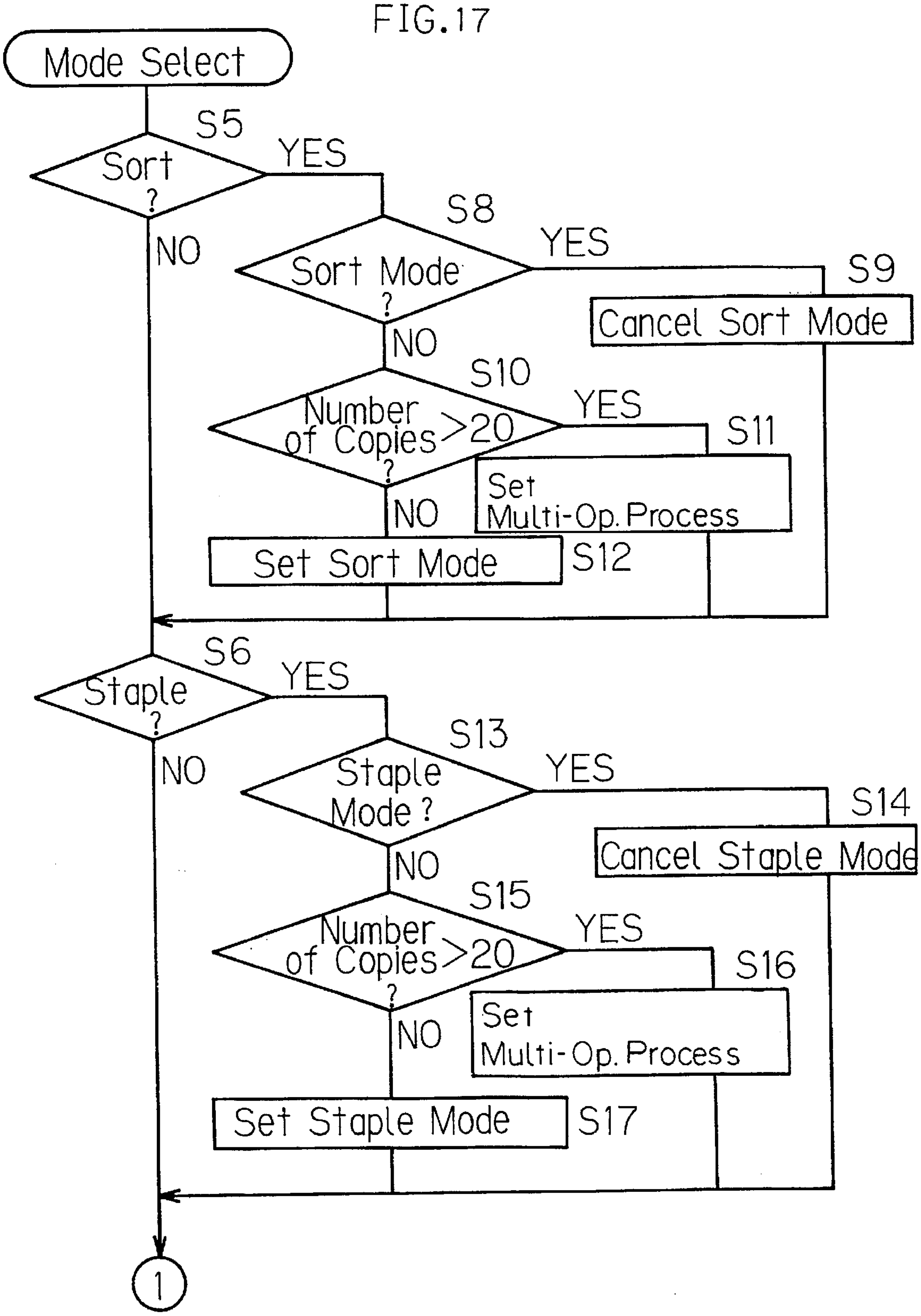
FIGS. 17 and 18 are flow charts illustrating a mode selecting operation by a main unit of the copying machine.
Figure 18:
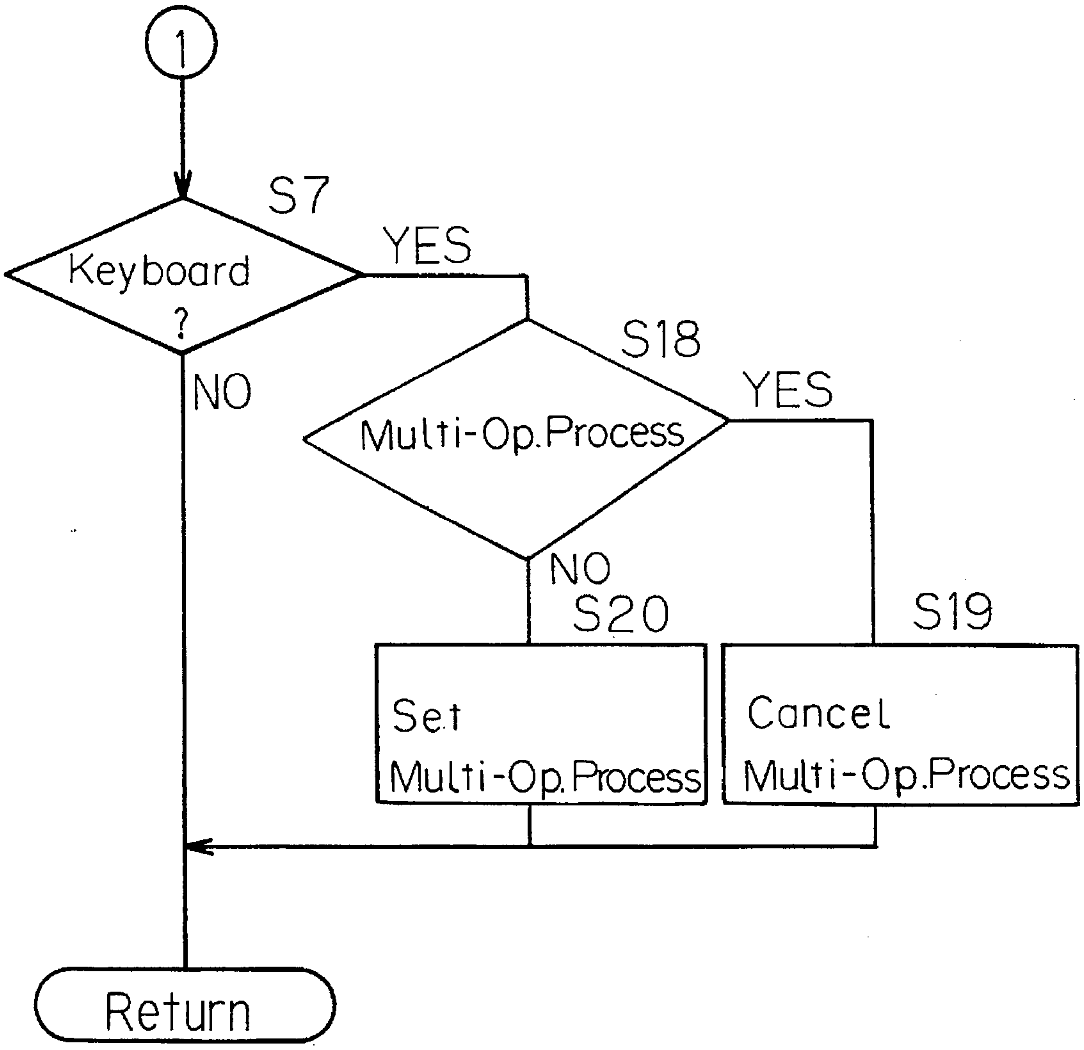

The mode selecting operation at step S3 is shown in FIGS. 17 and 18.

Referring to FIG. 17, it is determined at step S5 whether the key for sorting operation has been pressed. It is determined at step S6 whether the key for the stapling operation has been pressed. It is determined at step S7 in FIG. 18 whether the keyboard has been pressed.

When the sorting key is pressed, the program proceeds from step S5 to step S6. Wherein the sorting mode has been already set, the program proceeds to step S7, and the sorting mode is canceled. Meanwhile, wherein the sorting mode has not been set yet, the program proceeds from step S6 to step S8. It is determined at step S8 whether the set number of copies is more than the number of trays (20 in this example). Wherein it is, the program proceeds to step S9, wherein a multi-operation process is automatically set. Wherein the set number is 20 or less, the program proceeds from step S8 to step S10, wherein the sorting mode is set.

Wherein the stapling key has been pressed, the program proceeds from step S6 to step S11. It is determined at step S11 whether the stapling mode has been already set. Wherein it has been set, the program proceeds to step S12 and then, the stapling mode is canceled. On the other hand, if the stapling key is pressed while the stapling mode has not yet been set, the program proceeds from step S11 to step S13. It is determined at step S13 whether the set number of copies exceeds 20. Wherein it does, the program proceeds to step S14, wherein the multi-operation process is set. Meanwhile, wherein the set number of copies is 20 or less, the program proceeds from step S13 to step S15, wherein the stapling mode is set.

Wherein the keyboard has been pressed, the program proceeds from step S7 to step S16. It is determined at step S16 whether the multi-operation process has been already set. Wherein it has been already set, the program proceeds to step S17. At step S17, the multi-operation process is canceled. On the other hand, wherein the multi-operation process has not yet been set, the program proceeds from step S16 to step S18, wherein the multi-operation process is set.

Operation of Sorter

Figure 19:
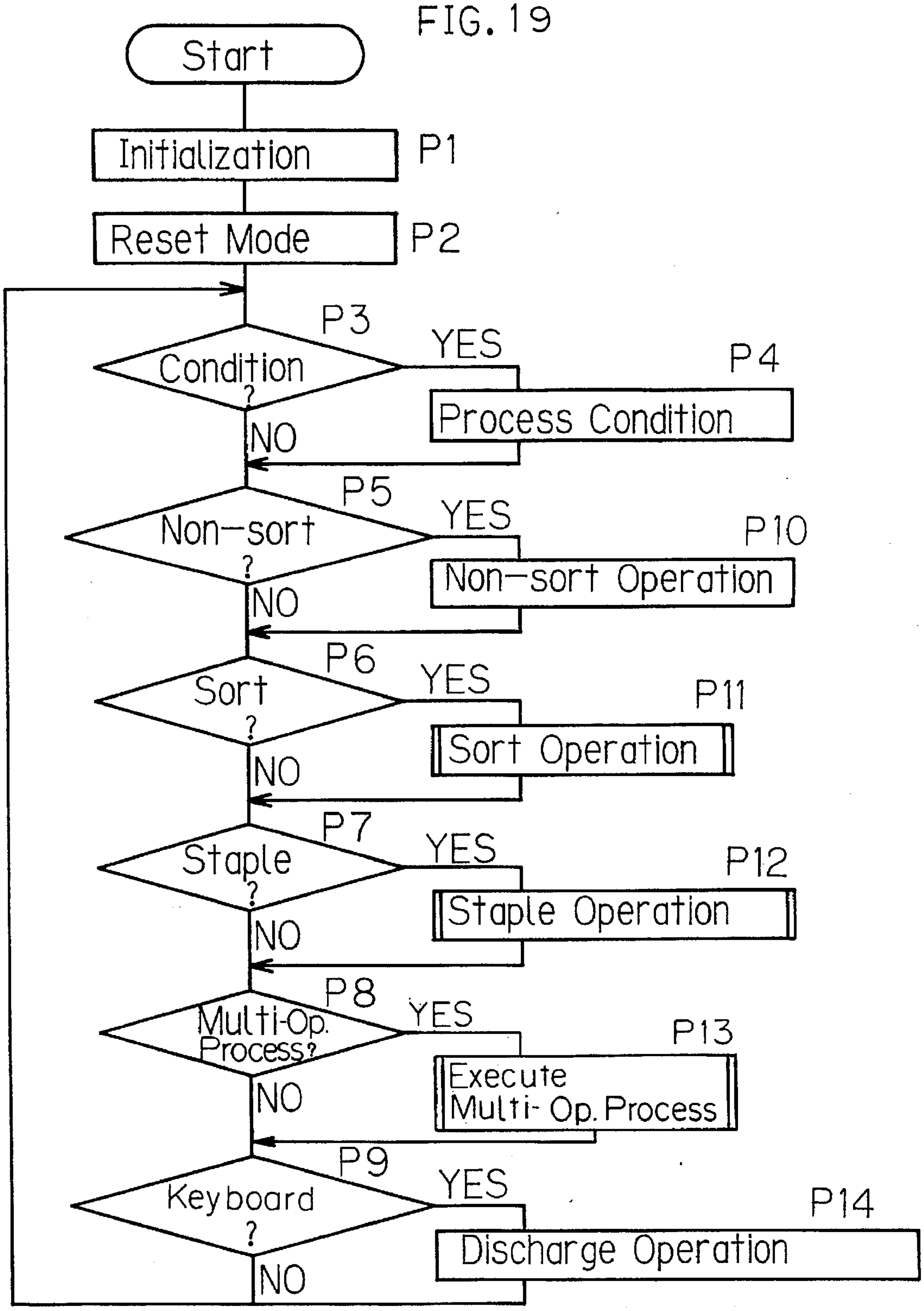
FIG. 19 is a flow chart illustrating a control system of the sorter.

An initialization procedure is carried out at step P1 in FIG. 19 in the sorter 2. In the initialization procedure, for example, both the stapler and the punching unit (where provided) reset into initial positions, or the fork 81 is switched to the tray 133 for the non-sorting mode of the photocopying machine installation.

At step P2, various modes are reset, and particularly as a result, the non-sorting mode, the non-stapling mode and the non-punching modes are set.

Then, at step P3, it is determined whether information on the processing condition, such as the number of sheets to be processed or contents of the set mode, has been sent from the copying machine 1. Wherein there is input for the processing condition, the program proceeds to step P4, wherein the operation modes corresponding to the condition are set.

It is determined at step P5 whether the operation mode is the non-sorting mode, at step P6 whether it is the sorting mode, at step P7 whether it is the stapling mode, at step P8 whether it is the multi-operation process, and step P9 whether the keyboard on the operation panel of the sorter 2 has been pressed.

Wherein the operation mode is the non-sorting mode, the program proceeds from step P5 to step P10, wherein the non-sorting operation is carried out. On the other hand, if the sorting mode has been set, the program proceeds from step P6 to step P11, wherein the sorting operation is carried out. Wherein the stapling mode has been set, the program proceeds from step P7 to step P12, wherein the stapling operation is carried out. Meanwhile, wherein the multi-operation process has been set, the program proceeds from step P8 to step P13, wherein a multiple operation is carried out. Wherein the keyboard has been pressed, the program proceeds from step P9 to step P14, wherein the bundled copy sheets in the trays 25 are compulsorily discharged.

Multi-Operation Process

Figure 20:
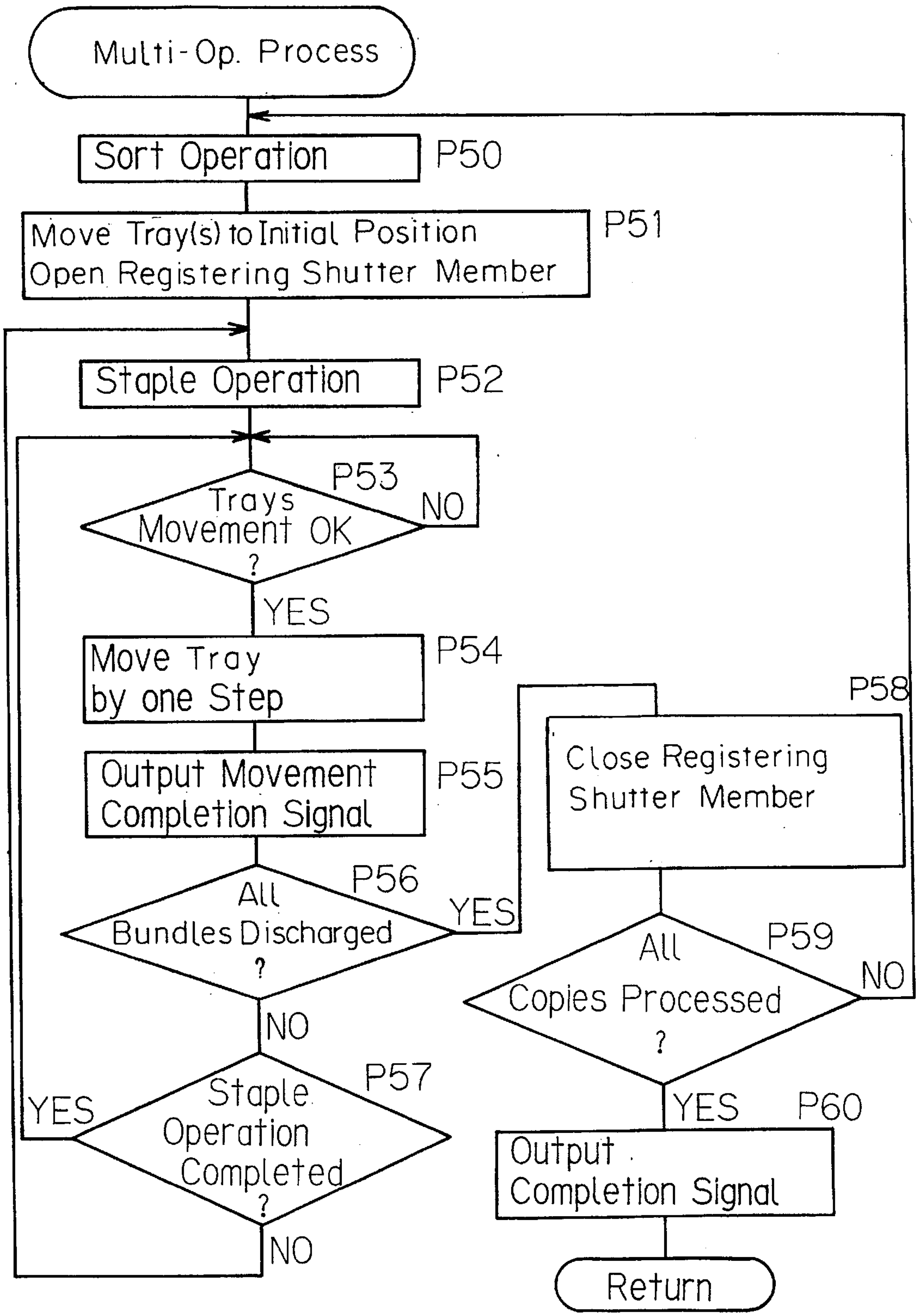
FIG. 20 is a flow chart illustrating a multiple operation by the sorter.

When designated, the multi-operation process illustrated in FIG. 20 is carried out.

Under the multi-operation process, the sorting operation is carried out at step P50. After the sorting operation is finished, the program proceeds to step P51, wherein all the trays 25 are shifted into the initial position for the stapling (bundling) operation. In addition, the registering shutter member 122 is lowered. Then, at step P52, the stapling operation is carried out.

Then, it is determined at step P53 whether the trays 25 should be shifted (lowered). With regard to the first of the trays 25, the determination should be YES, but with regard to the second and remaining of the trays 25, the determination is made according to whether a bundled sheet stack has been discharged from the tray 25 in question. Then, at step P54, each tray 25 is lowered by one step. Then, at step P55, a movement completion signal is output to the multi-bundle stacker control unit 257, whereby the copy sheet bundle is discharged from the tray 25 into the multi-bundle stacker 3.

At step P56 it is determined whether the stapled sheet bundles have all been discharged from the trays 25. Wherein there is any bundle remaining in the trays 25, the program proceeds to step P57. It is determined at step P57 whether the stapling operation has been completed for all the stacked sheets in the trays 25. Wherein it has not been completed, the program returns to step P52, and the operations at steps P52 to P56 are repeated. Wherein the stapling operation for all of the stacked sheets has been completed, the program proceeds to step P53, and the operations at steps P53 to P55, i.e., a procedure that lowers the bottom of the trays 25 by one step is carried out.

Accordingly, all of the now bundled sheet stacks housed in the sorter are ready to be withdrawn into the multi-bundle stacker 3 and the program proceeds from step P56 to step P58, whereupon the registering shutter member 122 is lifted.

It is then determined at step P59 whether the sorting operation, the bundling (stapling) operation and the discharging operation for the set number of copies have been completed. Wherein they have not been, the program returns from step P59 to step P50. More specifically, wherein the set number of copies is greater than the number of trays 25, the sorting operation, the stapling operation and the discharging operation are carried out the copy sheets currently stacked in the entire set of trays 25, and then the same operations are carried out on the next cycle of copy sheet stacks in the set of trays 25, or a final number of them. Once the operations have been performed to produce all of the designated number of copies of the document stack, the determination at step P59 becomes YES, and then the program proceeds to step P60, wherein the completion signal is output.

Control of Multi-Bundle Discharge/Stowing Device

Figure 21:
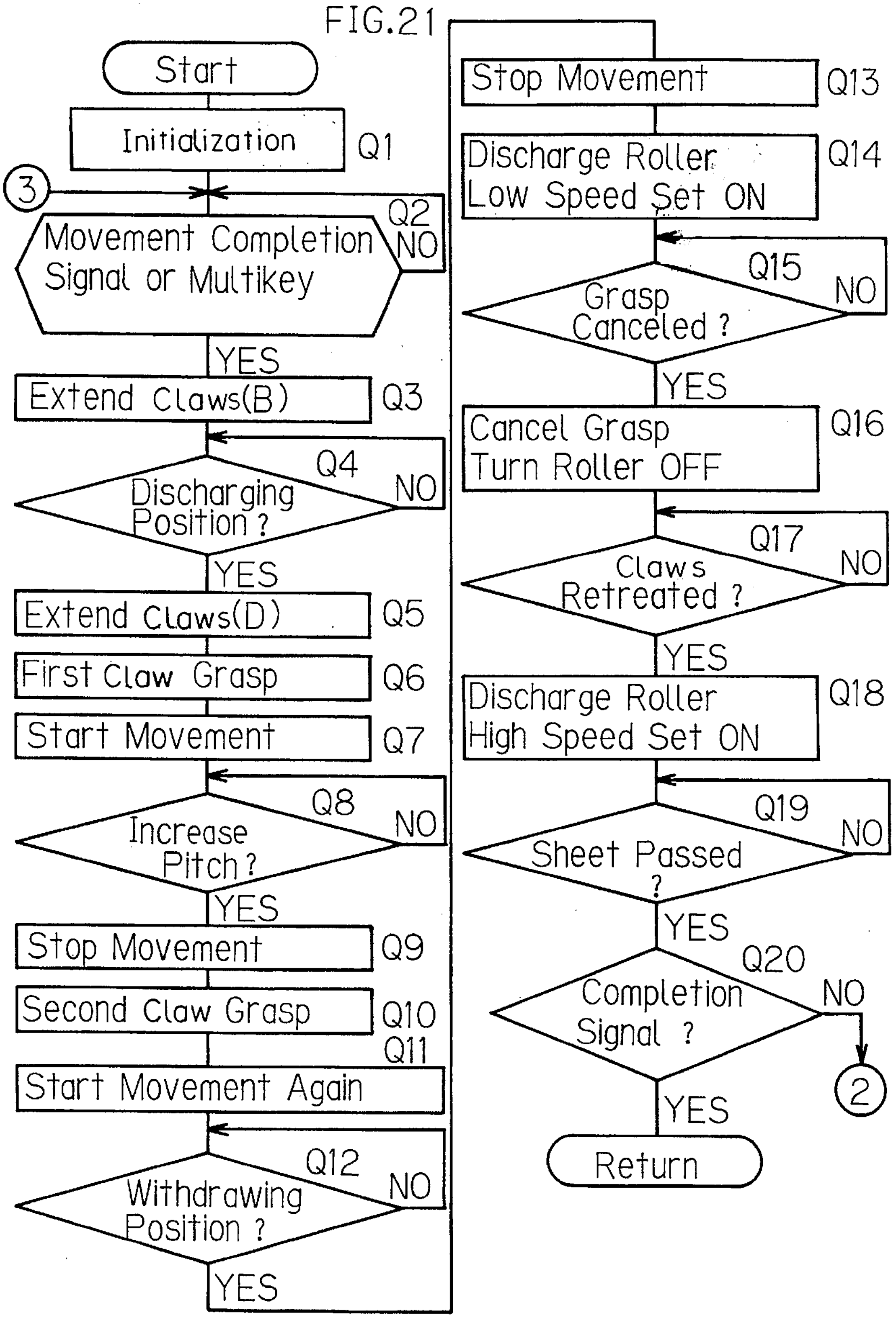
FIGS. 21 and 22 are flow charts illustrating a control system of the multi-stack discharge/stowing device.

FIG. 21 is a flow chart outlining a control process of the multi-bundle stacker 3.

Figure 23:
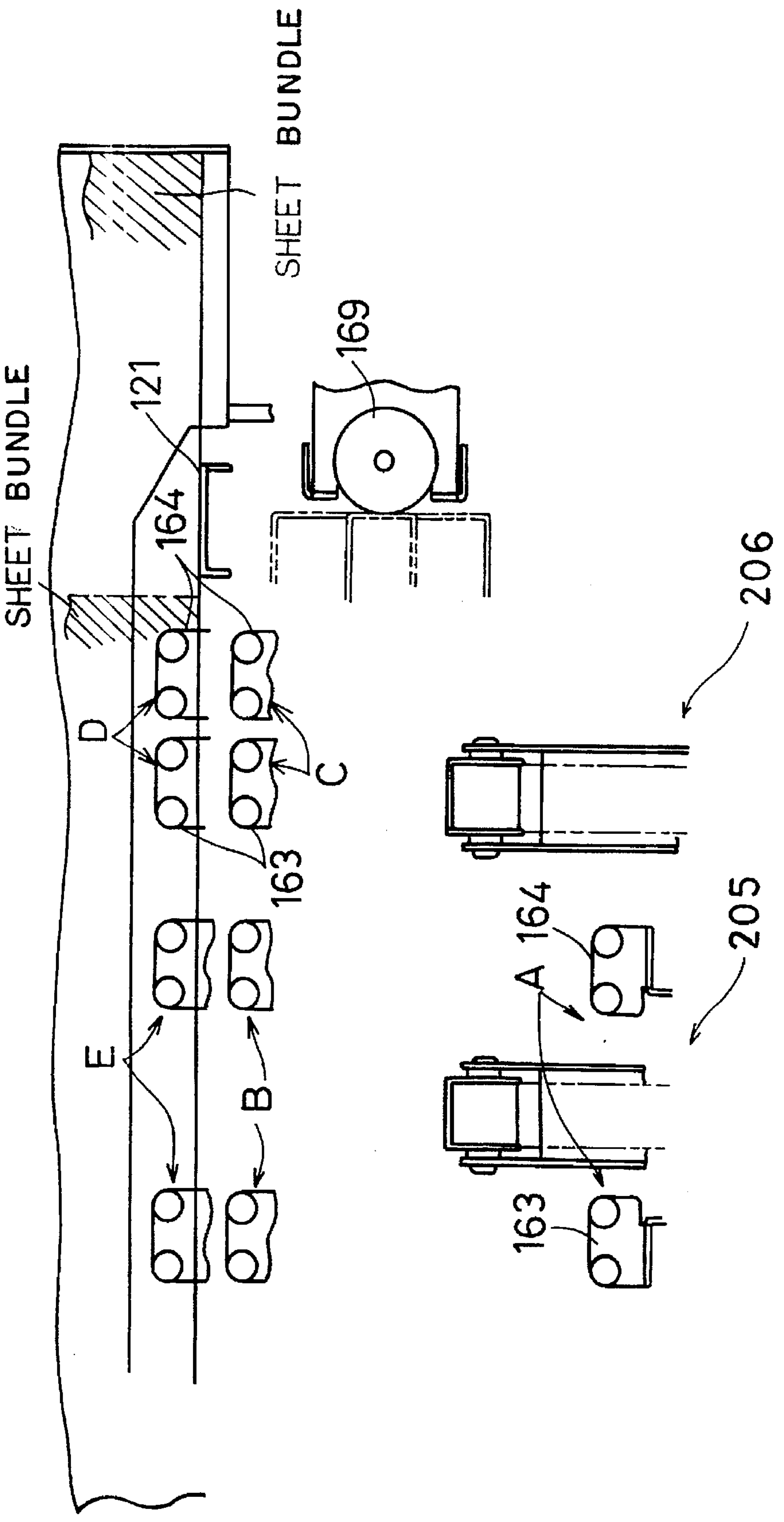
FIG. 23 is a fragmentary top view schematically indicating positions of sheet-bundle withdrawing claws in a sheet-bundle withdrawing operation alongside a sorting tray.

An initialization procedure is carried out at step Q1. In the initialization procedure, the first and second claws 163 and 164, for example, are returned to home position, i.e., the shifting table 160 is shifted into its home position. Then, it is determined at step Q2 whether the shift completion signal has been output from the sorter control unit 256, or whether the keyboard of the operation panel 251 of the sorter 2 has been pressed. Wherein the movement completion signal has been output or the keyboard has been pressed, the program proceeds from step Q2 to step Q3. At step Q3, both claws 163 and 164 are extended from the home positions indicated by A in FIG. 23 to a position indicated by B in the figure. At this time, the shutter **122*b* of the sorter 2 is lowered and opened. When both claws 163 and 164 are extended, the shifting table 160 is driven, whereby both claws 163 and 164 are moved toward the stopper roller 169 and stop at a position indicated by C. Then, it is determined at step Q4 whether the claws 163 and 164 are placed in the C position, i.e., the position from which the copy-sheet bundles are discharged. When the claws 163 and 164 are placed in the C position, the program proceeds to step Q5. At step Q5, the claws 163 and 164 are further extended toward the trays 25, to assume position D. Throughout these operations the claws 163 and 164 remain in an initial state, i.e., the solenoid is off and the upper and lower grips 180 and 181 are open (as indicated by the single-dashed broken line in FIG. 10**).

Then, at step Q6, the solenoid 185 of the first claw 163 is turned on and the lengthwise margin of the sheet stack to be bundled is grasped. Then, at step Q7, the shifting table 160 is driven and the first claw 163 is shifted in the bundle-discharging direction (in the direction away from the copying machine 1).

Then, it is determined at step Q8 whether the first claw 163 is apart from the second claw 164 by a predetermined distance. The determination is made by the sensor 178, which is turned on by the moving first claw 163. At this time, the first claw mounting plate 161 moving with the first claw 163 abuts on the end of the groove in the slide guide 171 fixed to the second claw mounting plate 162. Moreover, in the same moment, the adjacent lengthwise edges of the sheet stack are guided along the stationary registering member 121.

When the determination at step Q8 is YES, the program proceeds to step Q9. At step Q9, the movement of the shifting table 160 is stopped momentarily. Then, at step Q10, the solenoid 185 of the second claw 164 is turned on and the lengthwise margin of the sheet bundle is grasped. Then, at step Q11, the shifting table 160 is driven again, and it is determined at step Q12 whether the claws 163 and 164 are placed into a withdrawing position, as indicated by E in FIG. 23. Wherein the claws 163 and 164 are placed in the E position, the program proceeds to step Q13, wherein the movement of the shifting table 160 is stopped. At step Q14, the claws 163 and 164 are shifted frontward for withdrawing the copy sheet bundle from the tray 25, and the roller units 105 and 106 are moved at low speed in synchronization with the moving speed of the claws 163 and 164.

It is then determined at step Q15 whether the claws 163 and 164 are placed into a position from where the copy sheet bundles are released. The releasing position is the position where the lateral ends of the bundled sheets are grasped by the follower rollers 209 of the roller units 205 and 206. Accordingly, using a pulse detection device it is determined when the claws 163 and 164 have been shifted a predetermined distance by the motor 190 of the first drive mechanism 165. Alternatively, this determination may also be made using a paper-jam detecting photointerrupter 230 (FIG. 10) installed over the bundle discharge/stowing path 153. When the claws 163 and 164 are shifted into the releasing position, the program proceeds to step Q16, wherein the solenoids 185 of the claws 163 and 164 are turned off, thereby releasing the copy-sheet bundle, whereupon the roller units 205 and 206 are also switched off. Because the claw 164 is freely movable transversely, along the incline of the claw mechanism 150, (inclined to generally follow the slope of the tray 25 presented for bundle discharging), under its own weight it falls transversely into its original orientation.

The claws 163 and 164 are further retreated toward the front side of the machine, and claw 163 is retracted transversely as well. Then, the guide rollers 170, mounted on the bottom end of each of the claws 163 and 164, are guided downward along the guide member 177, whereby the claws 163 and 164 retract under the bundle discharge/stowing path 153. It is determined at step Q17 whether each of the claws 163 and 164 has been shifted into this retracted position, i.e., that as indicated by the solid-line rendering of the claw mechanism 150 in FIG. 10.

When the claws 163 and 164 have been returned into their respective home positions, the program proceeds to step Q18. At step Q18, in order to discharge the copy sheet bundle, the roller units 205 and 206 are switched on again, but this time the rollers 209 are spun at higher speed than that for withdrawing the bundle from the tray 25. Thereby, the bundle is guided further along the bundle discharge/stowing path 153. When the lengthwise edge of the bundle opposite that grasped by the claws 163 and 164 has left the roller units 205 and 206, the bundle drops into the stowing bin 152 guided endwise by the bundle stowing guide 301, and the bundle turning guide assembly 302 together with the guide apron 318, discharging finally endwise onto standing wall 225 and stacking on the receiving platform 226. (This is explained further in a fuller elaboration below.)

Figure 22:
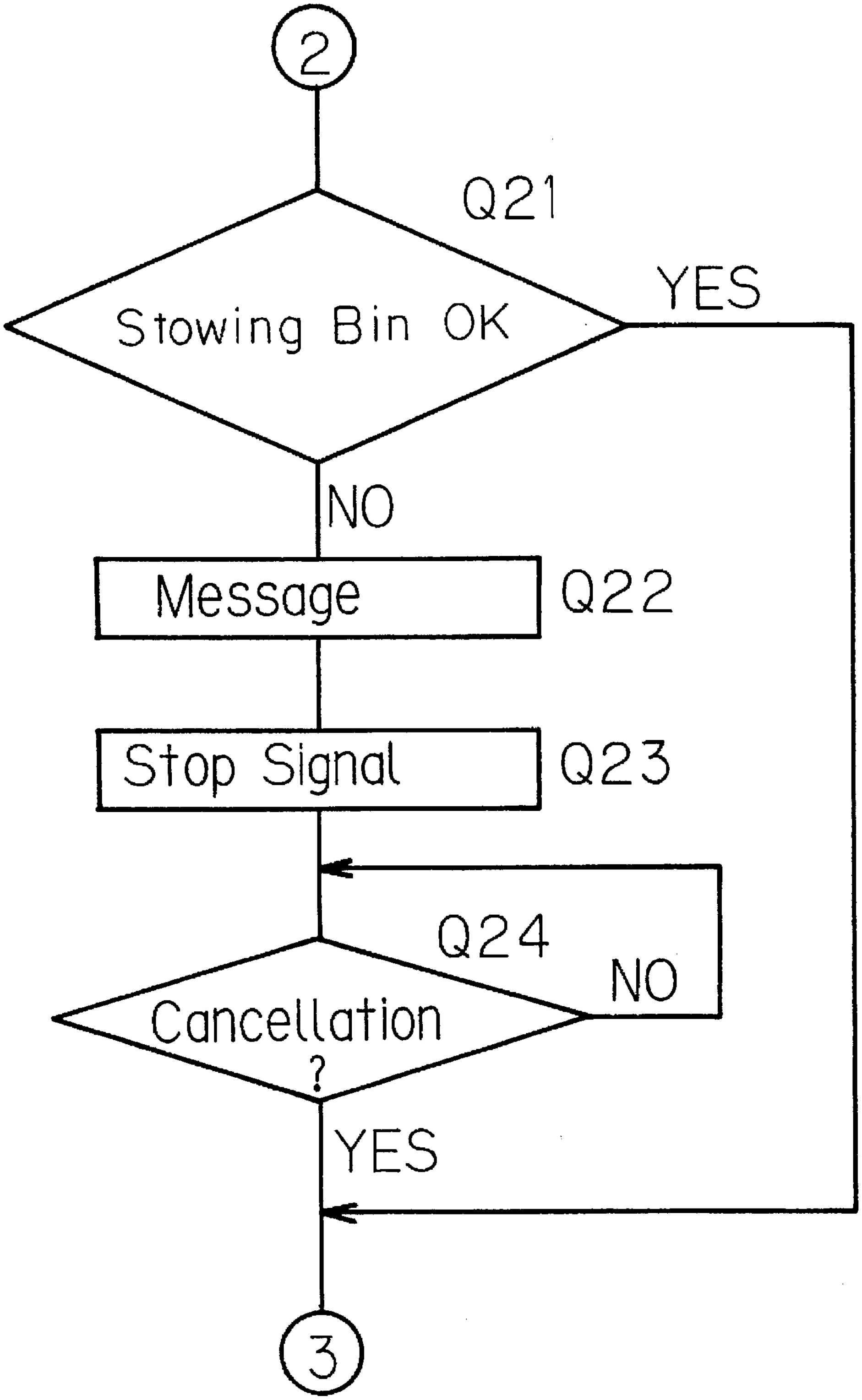

It is determined at step Q19 whether the bundle currently in discharge has passed through each of the claws 163 and 164. Once it is concluded that the bundle has passed the claws 163 and 164, the program proceeds to step Q20. It is determined at step Q20 whether the completion signal is output from the sorter control unit 256. Wherein there remain copy-sheet bundles on the sorter 2 side in the trays 25, the program proceeds from step Q20 to step Q21, in the routine as outlined in FIG. 22. At this step, it is determined whether the stowing bin 152 is full. If the stowing bin 152 is full, i.e., any further discharge/stowing operations cannot be allowed, then the program proceeds from step Q21 to step Q22. At step Q22, a signal for displaying a message to that effect is output to the copier operation panel 250 of the copying machine body control unit 255. Then, at step Q23, the stop signal is output to the sorter control unit 256 and the copying machine body control unit 255. Thus, operation in all relevant sections of the copying machine/sorter/stacker installation are interrupted. Then, at step Q24, the copy sheet bundles can be removed from the stowing bin 152, and the control system is paused, awaiting output of the cancellation signal. When the cancellation signal is output, the program returns to step Q2 of FIG. 27 and the above-described operations are repeated. In addition, wherein the determination at step Q21 is YES, the program also returns to step Q2 and the above-described operations are repeated.

Once all of the copy-sheet bundles stored in the trays 25 of the sorter 2 have been discharged, the completion signal is output from the sorter control unit 256. The determination at step Q20 is YES when the multi-bundle discharge/stowing device control unit 257 receives the completion signal, whereupon the multi-operation process is completed.

Copy-Sheet Bundle Discharge/Stowing Operation (FIGS. 7 and 8)

When the drive rollers 208 of the roller units 205 and 206 are spun at high speed to discharge the copy-sheet bundle into discharge along the bundle discharge/stowing path 153, the bundle (marked "B" in FIGS. 7 and 8) is guided by the bundle stowing guide 301 to travel down toward the stowing bin 152. Leaving the guide 301, the bundle B is dropped into stowage on the bundle-receiving platform 226 at the bottom of the bundle stowing guide 301, the bundle is turned aright by, and pushed off endwise from, the bundle turning guide assembly 302. Thereupon, leaving the bundle turning guide assembly 302, the bundle B makes a brief free-fall, dropping correctly oriented into a stack on the receiving platform 226. In this way, the bottom surface of the bundle B lands generally at once on the receiving platform 226, (or on the accumulating bundle stack) in the stowing bin 152.

(a) Features and Function of the Bundle Stowing Guide 301

The bundle stowing guide 301 is positioned to receive and guide downward the trailing end (with respect to copy sheet orientation when the sheets are discharged from the copying machine into the sorting trays 25) of a bundle discharged from the roller units 205 and 206 in the discharge/stowing path 153. The bundle stowing guide 301 is introduced into the discharge/stowing path 153 set at a tilt such that it separates further off the standing wall 225 toward its lower end. Accordingly, the bundle B drops from the bundle stowing guide 301 without dragging along the standing wall 225. This allows the bundle B to land evenly on the receiving platform 226 and to settle smoothly under its own weight endwise against the standing wall 225.

The entire bundle stowing guide 301 is mounted with its bottom end tilted toward the front of the multi-bundle stacker 3, and the rear wall 301*c* is bent in the same direction, thereby consistently to guide the downward portion of the bundle B toward the front of the stacker 3. Moreover, the stepped tapering of the rear wall 301*c* toward and into the channel wall 301*a* allows the upward portion of the bundle B to fall toward the rear of the multi-bundle stacker 3 after being pushed by the pusher mechanism 304, thereby ensuring that each bundle landing into a stack on the receiving platform 226 will be oriented correctly.

(b) Features and Function of the Copy-Sheet Bundle Endwise Receiving and Guiding Means (Guide Plate 306 and Guide Apron 318)

Before the linking mechanism 305 is operated to retract the guide plate 306 through the standing wall 225, the trailing end of the bundle B, turning toward horizontal as it leaves the bundle stowing guide 301, is guided by the guide plate 306 further toward the front of the multi-bundle stacker 3. Meanwhile, the leading end (again, with respect to the orientation of the copy sheets when discharged from the copying machine into the sorting trays 25) of the bundle B is guided likewise by the guide element 318*a* of the guide apron 318.

The configuration of the copy-sheet bundle endwise receiving and guiding means accordingly ensures that even irregularly stacked and stapled bundles will land bottom down evenly into a correctly situated stack on the receiving platform 226.

(c) Feature and Function of the Pushing Mechanism 304

When the upper portion of the trailing end of the bundle B dropping in discharge has completely left the bundle stowing guide 301, having turned onto the guide plate 306, the linking mechanism 305 is operated to retract the guide plate 306 into the standing wall 225. Consequently, the plate 310*b* of the pushing element 310 pushes the upper portion of the trailing end of the bundle B down off the retracting guide plate 306 and toward the rear of the multi-bundle stacker 3. Accordingly, the operation of the pusher mechanism 304 in conjunction with the retracting of the guide plate 306 ensures that the bundles will always land rightly on the receiving platform 226, and that none will drop irregularly and remain stuck up against the front of the stacker 3.

(d) Function of the Rear Guide Feature 226*a*

The rear guide feature 226*a* on the bundle-receiving platform 226 is sloped to guide the bundle B to slide back toward the standing wall 225 after its brief free-falling drop. Accordingly, after landing into a stack on the receiving platform, the discharged bundle B settles into endwise alignment against the orthogonally positioned standing wall 225.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A copy-sheet bundle discharge-handling and guided stowing apparatus for an image-reproducing installation including a copying machine and an adjacent copy-sheet sorter having a plurality of upwardly inclined sorting trays into which multiple copy sheets produced from an original document stack are discharged sideways from the copying machine and thereby sorted, and wherein the sorted copy sheets are subsequently bundled, said copy-sheet bundle discharge-handling and guided stowing apparatus being functional in the image-reproducing installation in a position frontward of the copy-sheet sorter, and said copy-sheet bundle discharge-handling and guided stowing apparatus comprising:

an inclined bundle-discharging means for transversely discharging a bundle frontward from an adjacently parallel sorting tray of the copy-sheet sorter, and conducting the bundle into a bundle discharge/stowing path;

a bundle stowing bin disposed beneath the bundle-discharging means, having a bottomward bundle-receiving platform disposed at an inclination generally parallel to said bundle-discharging means, for receiving into a stack, bundles discharged from the bundle-discharging means;

a standing wall, disposed orthogonally adjacent said bundle-receiving platform, therein situated to lie along a trailing end nearest the copying machine of a sheet bundle dropping in discharge from said bundle-discharging means; and a bundle stowing guide disposed to lie in the bundle discharge/stowing path over said standing wall;

said bundle stowing guide being formed for guiding a sheet bundle discharged from said bundle-discharging means such that the sheet bundle is guided frontward by the trailing end to leave said sheet bundle stowing guide off said standing wall and to drop into a stack on said bundle-receiving platform.

2. A copy-sheet bundle discharge-handling and guided stowing apparatus according to claim 1, further comprising a bundle-turning guide assembly disposed under said bundle stowing guide, for guiding forward a lower portion of the trailing end of a sheet bundle in discharge guided by said bundle stowing guide, meanwhile turning the sheet bundle toward horizontal.

3. A copy-sheet bundle discharge-handling and guided stowing apparatus according to claim 2, wherein said bundle-turning guide assembly comprises a bundle endwise pushing means for pushing an upper portion of the trailing end of a sheet bundle in stowage guided by said bundle stowing guide rearward off said bundle-turning guide assembly.

4. A copy-sheet bundle discharge-handling and guided stowing apparatus according to claim 2, wherein said bundle-turning guide assembly further comprises a receiving guide positioned to contact and guide frontward the trailing end of a sheet bundle in stowage guided by said bundle stowing guide.

5. A copy-sheet bundle discharge-handling and guided stowing apparatus according to claim 4, wherein said bundle-turning guide assembly further comprises means for elastically retaining said receiving guide in a position for receiving and guided turning of the trailing end of a sheet bundle in stowage guided by said bundle stowing guide.

6. A copy-sheet bundle discharge-handling and guided stowing apparatus according to claim 5, wherein said bundle-turning guide assembly further comprises receiving guide retracting means for retracting said receiving guide clear of the trailing end of a sheet bundle in stowage guided by said bundle stowing guide when an upper portion of the trailing end of the sheet bundle has left said bundle stowing guide.

7. A copy-sheet bundle discharge-handling and guided stowing apparatus according to claim 6, wherein said bundle-turning guide assembly further comprises a bundle endwise pushing means for pushing an upper portion of the trailing end of a sheet bundle in stowage guided by said bundle stowing guide rearward off said bundle-turning guide assembly.

8. A copy-sheet bundle discharge-handling and guided stowing apparatus according to claim 7, wherein said bundle-turning guide assembly further comprises linking means for temporarily coupling said retracting means and said pushing means such that said pushing means is co-operative with said retracting means; wherein said pushing means pushes the upper portion of the trailing end of a sheet bundle in stowage, meanwhile said retracting means retracts said receiving guide clear of the trailing end of the sheet bundle.

9. A copy-sheet bundle discharge-handling and guided stowing apparatus according to claim 1, further comprising a bundle-turning guide assembly disposed under said bundle stowing guide, for guiding forward a lower portion of the trailing end of a sheet bundle in discharge guided by said bundle stowing guide, meanwhile turning the sheet bundle toward horizontal; wherein said bundle-turning guide assembly includes a bundle endwise pushing means for pushing an upper portion of the trailing end of a sheet bundle in stowage guided by said bundle stowing guide rearward off said bundle-turning guide assembly.

10. A copy-sheet bundle discharge-handling and guided stowing apparatus according to claim 1, wherein said bundle stowing guide is mounted in the apparatus to lie tilted with respect to said standing wall such that a lower portion of said bundle stowing guide is apart from said standing wall.

11. A copy-sheet bundle discharge-handling and guided stowing apparatus according to claim 1, wherein said bundle stowing guide is mounted in the apparatus to lie downwardly inclined toward a front side of the apparatus.

12. A copy-sheet bundle discharge-handling and guided stowing apparatus according to claim 1, wherein said bundle stowing guide is formed generally U-shaped in cross section, having a rear wall, a channel wall, and a front wall.

13. A copy-sheet bundle discharge-handling and guided stowing apparatus according to claim 12, wherein a lower portion of the bundle stowing guide rear wall is inclined toward the front side of the apparatus.

14. A copy-sheet bundle discharge-handling and guided stowing apparatus according to claim 13, wherein said bundle stowing guide rear wall is formed to taper downward gradually toward and into said channel wall.

15. A copy-sheet bundle discharge-handling and guided stowing apparatus according to claim 1, wherein said bundle stowing guide is mounted in the apparatus to retain a specified separation between a lower end of said bundle stowing guide and said bundle-receiving platform in said bundle stowing bin.

16. A copy-sheet bundle discharge-handling and guided stowing apparatus according to claim 1, wherein said bundle-receiving platform is formed such that a rearward portion thereof is inclined upward, and a frontward portion thereof extends in a planar bed generally orthogonal to a front side of said bundle stowing bin.

17. A copy-sheet bundle discharge-handling and guided stowing apparatus according to claim 1, wherein rear guide feature is formed and situated in said bundle-receiving platform such that bundles dropping from said bundle stowing guide and received into a stack on said bundle-receiving platform settle into endwise alignment against said standing wall.

18. A copy-sheet bundle discharge-handling and guided stowing apparatus for an image-reproducing installation including a copying machine and an adjacent copy-sheet sorter having a plurality of sorting trays into which multiple copy sheets produced from an original document stack are discharged sideways from the copying machine and thereby sorted, and wherein the sorted copy sheets are subsequently bundled, said copy-sheet bundle discharge-handling and guided stowing apparatus being functional in the image-reproducing installation in a position frontward of the copy-sheet sorter, and said copy-sheet bundle discharge-handling and guided stowing apparatus comprising:

a bundle-discharging means for transversely discharging a bundle frontward from an adjacent sorting tray of the copy-sheet sorter, and thereby dropping the bundle into a bundle discharge/stowing path;

a bundle stowing bin disposed beneath the bundle-discharging means, having a bottomward bundle-receiving platform, for receiving into a stack, bundles discharged from the bundle-discharging means; and a bundle endwise receiving and guiding means disposed in the bundle discharge/stowing path between said bundle-discharging means and said bundle stowing bin, for endwise guiding forward a lower portion of a sheet bundle discharged in stowage from said bundle-discharging means, meanwhile turning the sheet bundle toward horizontal, said bundle endwise receiving and guiding means including a receiving guide positioned to contact a trailing end nearest the copying machine of a sheet bundle in stowage dropping along the bundle discharge/stowing path, and means for elastically retaining said receiving guide in a position for receiving and guided turning of the trailing end of a sheet bundle in stowage.

19. A copy-sheet bundle discharge-handling and guided stowing apparatus according to claim 18, wherein said bundle endwise receiving and guiding means comprises a guide element positioned to contact a leading end farthest from the copying machine of a sheet bundle in stowage dropping along the bundle discharge/stowing path.

20. A copy-sheet bundle discharge-handling and guided stowing apparatus according to claim 19, wherein said guide element is a molded guide apron.

21. A copy-sheet bundle discharge-handling and guided stowing apparatus according to claim 20, wherein said bundle endwise receiving and guiding means further comprises receiving guide retracting means for retracting said receiving guide clear of the trailing end of a sheet bundle in stowage when an upper portion of the trailing end of the sheet bundle has arrived on said receiving guide.

22. A copy-sheet bundle discharge-handling and guided stowing apparatus according to claim 21, wherein said bundle endwise receiving and guiding means further comprises a bundle endwise pushing means for pushing an upper portion of the trailing end of a sheet bundle in stowage rearward off said bundle endwise receiving and guiding means.

23. A copy sheet bundle discharge-handling and guided stowing apparatus according to claim 22, wherein said bundle endwise receiving and guiding means further comprises linking means coupling said retracting means and said pushing means such that said pushing means is co-operative with said retracting means; wherein said pushing means pushes the upper portion of the trailing end of a sheet bundle in stowage, meanwhile said retracting means retracts said receiving guide clear of the trailing end of the sheet bundle.

24. A copy-sheet bundle discharge-handling and guided stowing apparatus according to claim 18, wherein said bundle-receiving platform is formed such that a rearward portion thereof inclines upward, and a frontward portion thereof extends in a planar bed generally orthogonal to a front side of said bundle stowing bin.

25. A copy-sheet bundle discharge-handling and guided stowing apparatus according to claim 18, wherein a rear guide feature is formed and situated in said bundle-receiving platform such that bundles dropping along the bundle discharge/stowing path and received into a stack on said bundle-receiving platform settle into endwise-alignment against a side of said bundle stowing bin toward the copying machine.

26. A copy-sheet bundle discharge-handling and guided stowing apparatus for an image-producing installation including a copying machine and an adjacent copy-sheet sorter having a plurality of sorting trays into which multiple copy sheets produced from an original document stack are discharged sideways from the copying machine and thereby sorted, and wherein the sorted copy sheets are subsequently bundled, said copy-sheet bundle discharge-handling and guided stowing apparatus being functional in the image-reproducing installation in a position frontward of the copy-sheet sorter, and said copy-sheet bundle discharge-handling and guided stowing apparatus comprising:

a bundle-discharging means for transversely discharging a bundle frontward from an adjacent sorting tray of the copy-sheet sorter, and thereby dropping the bundle into stowage along a bundle discharge/stowing path;

a bundle stowing bin disposed beneath the bundle-discharging means, for receiving into a stack bundles discharged from the bundle-discharging means; and a bundle guide assembly, disposed in the bundle discharge/stowing path between said bundle-discharging means and said bundle stowing bin, for endwise guiding forward a lower portion of a sheet bundle discharged in stowage from said bundle-discharging means, meanwhile turning the sheet bundle toward horizontal; wherein said bundle guide assembly includes a bundle endwise pushing means for pushing an upper portion of a trailing end nearest the copying machine of a sheet bundle in stowage along the bundle discharge/stowage path rearward off said bundle guide assembly.

27. A copy-sheet bundle discharge-handling and guided stowing apparatus according to claim 26, wherein said bundle endwise pushing means comprises a pushing element, and drive means for driving the pushing element to function when an upper portion of the trailing end of the sheet bundle has arrived on said bundle guide assembly.

* * * * *